United States Patent [19]
Hayakawa

[11] Patent Number: 6,130,993
[45] Date of Patent: Oct. 10, 2000

[54] CAMERA HAVING AN IMAGE STABILIZER

[75] Inventor: Masahiro Hayakawa, Kanagawa, Japan

[73] Assignee: Asahi Kogaku Kogyo Kabushiki Kaisha, Tokyo, Japan

[21] Appl. No.: 09/294,911

[22] Filed: Apr. 20, 1999

[30] Foreign Application Priority Data

| Apr. 20, 1998 | [JP] | Japan | 10-109906 |
| Apr. 20, 1998 | [JP] | Japan | 10-109907 |
| Apr. 20, 1998 | [JP] | Japan | 10-109908 |
| Jun. 18, 1998 | [JP] | Japan | 10-170881 |

[51] Int. Cl.$^7$ ............ G03B 13/36; G03B 17/00
[52] U.S. Cl. ............................ 396/55; 396/89
[58] Field of Search ............. 396/52, 53, 54, 396/55, 89

[56] References Cited

U.S. PATENT DOCUMENTS

| 5,041,852 | 8/1991 | Misawa et al. | 396/55 |
| 5,072,251 | 12/1991 | Tamura et al. | 396/52 |
| 5,305,040 | 4/1994 | Enomoto . | |
| 5,541,693 | 7/1996 | Enomoto . | |
| 5,583,597 | 12/1996 | Enomoto . | |
| 5,655,157 | 8/1997 | Enomoto . | |
| 5,956,529 | 9/1999 | Lee et al. | 396/55 |

FOREIGN PATENT DOCUMENTS 2284113  11/1990  Japan .

*Primary Examiner*—W. B. Perkey
*Attorney, Agent, or Firm*—Greenblum & Bernstein, P.L.C.

[57]  ABSTRACT

A camera having an image stabilizer, includes a camera body; a photographic lens for forming an image of an object on an image plane of the camera body; at least one movable mirror positioned in an optical path between the photographing lens and the image plane; a vibration sensor for detecting the magnitude of a vibration and the direction thereof given to the camera body; and a mirror drive mechanism for driving the movable mirror in accordance with the magnitude of the vibration and the direction thereof detected by the vibration sensor.

34 Claims, 16 Drawing Sheets

CAMERA HAVING AN IMAGE STABILIZER

BACKGROUND OF THE INVENTION

1. Field of the Invention

The present invention relates to a camera having an image stabilizer for stabilizing an image formed on a film surface when the image shakes due to unstable movement of the camera. The present invention also relates to a method of controlling such a camera, and further relates to a method of compensating the image shake of such a camera.

2. Description of the Related Art

An image stabilizer used for an optical device that is provided in a photographic optical system thereof with a variable-vertical-angle prism which is controlled to vary the vertical angle thereof to compensate the shaking of an image formed on a sensitive film surface (hereinafter also referred to as "image shake") has been proposed. Another type of image stabilizer used for an optical device that is provided with a mechanism for moving at least a part of a photographic optical system in a direction perpendicular to the optical axis of the photographic optical system has been proposed. In the case where either conventional type image stabilizer is used for a camera, the variable-vertical-angle prism or the moving part of the photographic optical system needs to be arranged within the photographic lens (photographic lens barrel), which increases the size of the photographic lens. Furthermore, providing an image stabilizer within a photographic lens generally limits the design and arrangement of the lens elements, the shutter mechanism, the zooming mechanism, and other components in the photographic lens. In particular, in the case of a lens-interchangeable camera system, providing an image stabilizer in an interchangeable lens is not practical.

Furthermore, depending on the type of image stabilizer, the optical path length between the photographing lens and an image plane may vary to thereby cause the focal point to deviate from an optimum point thereof when a compensation system is moved to compensate image shake.

SUMMARY OF THE INVENTION

The present invention has been established so as to overcome the aforementioned problems. An object of the present invention is to provide a camera having an image stabilizer for stabilizing an image formed on a film surface when the image shakes due to unstable movement of the camera, wherein the minimal limitation of design is incurred on the photographic lens of the camera. Another object of the present invention is to provide a method of controlling such a camera; and yet another object of the present invention is to provide a method of compensating the image shake of such a camera.

According to an aspect of the present invention, there is provided a camera having an image stabilizer, including: a camera body; a photographic lens for forming an image of an object on an image plane of the camera body; at least one movable mirror positioned in an optical path between the photographing lens and the image plane; a vibration sensor for detecting the magnitude of a vibration and the direction thereof given to the camera body; and a mirror drive mechanism for driving the movable mirror in accordance with the magnitude of the vibration and the direction thereof detected by the vibration sensor.

With the above structure, the mirror drive mechanism drives the movable mirror so that the image formed on the image plane by the photographing lens moves in a predetermined direction parallel to the image plane.

Preferably, the camera further includes a detector for detecting the amount of movement of the movable mirror from an initial position thereof, and the direction of the movement of the movable mirror; an AF mechanism for performing an AF operation in accordance with object distance information; and a controller for controlling the AF mechanism in accordance with the amount of movement of the movable mirror and the direction thereof, which are detected by the detector, so that the AF mechanism further performs the AF operation to compensate a variation (amount of change) of an optical path length that is caused by movement of the movable mirror.

In an embodiment, the AF mechanism includes a focusing lens group which is provided as an element of the photographic lens and guided to move along an optical axis of the photographic lens; a distance information device for obtaining object distance information related to an object distance of an object which is to be photographed; a controller for determining an in-focus position of the focusing lens group on an optical axis thereof in accordance with the object distance information, the controller producing a drive signal corresponding to the determined in-focus position; and a moving device for moving the focusing lens group in accordance with the drive signal. In this type of AF mechanism, the controller determines the in-focus position of the focusing lens group, utilizing the object distance information with consideration of the variation of an optical path length being caused by movement of the movable mirror.

Alternatively, in the AF mechanism, a focus deviation caused by the movement of the movable mirror can be compensated via the moving of an image-recording medium in a direction perpendicular to the image plane. For example, the image-recording medium can be a sensitive film or an image pick-up device.

In each type of AF mechanism, it is preferable that a memory for storing a data table which contains compensation values for compensating the variation of the optical path length is included. The controller selects a compensation value, which corresponds to the variation of the optical path length, from the data table in accordance with the amount of movement of the movable mirror and the direction thereof, to determine in-focus position of the focusing lens group or image-recording medium with consideration of the compensation value.

The camera can include a pair of movable mirrors; a pair of drive mechanisms for driving the pair of movable mirrors so that the image formed on the image plane moves on the image plane in predetermined two different directions on the plane, respectively. In this case, it is preferable that the AF mechanism performs the AF operation to compensate a variation of an optical path length caused by a combination of movement of the pair of movable mirrors in accordance with the amount of movement of each movable mirror and the direction thereof which are detected by the detector. Further, it is preferable that the camera includes a memory for storing a data table which contains compensation values for compensating the variation of the optical path length.

For detecting the moving position of the movable mirror, in an embodiment, the mirror drive mechanism includes at least one stepper motor for driving the at least one movable mirror having an index for indicating the initial position. The detector includes a sensor for sensing the index, and a device for determining the amount of movement of the movable mirror from the initial position and the direction of movement of the movable mirror in accordance with the number of pulses contained in a drive signal input to the stepper motor.

The mirror drive mechanism can include a linear guide mechanism for guiding the movable mirror to move along an incident direction of light which is incident on the movable mirror; and a moving device for linearly moving the movable mirror in accordance with the magnitude of the vibration and the direction thereof to move light which is reflected by the movable mirror in a direction of movement of the movable mirror.

Alternatively, he mirror drive mechanism includes a supporting mechanism for supporting the movable mirror to be rotatable about a rotational axis thereof which extends perpendicular to a plane including first light which is incident on the movable mirror and second light which is reflected by the movable mirror; and a moving device for rotating the movable mirror in accordance with the magnitude of the vibration and the direction thereof to deflect light which is reflected by the movable mirror.

According to another aspect of the present invention, there is provided a method of controlling a camera having an image stabilizer, which includes a camera body; a photographic lens for forming an image of an object on an image plane of the camera body; at least one movable mirror positioned in an optical path between the photographing lens and the image plane; and an AF mechanism for performing an AF operation in accordance with object distance information. The method comprises: detecting the magnitude of a vibration and the direction thereof given to the camera body; driving the movable mirror in accordance with the magnitude of the vibration and the direction thereof so that the image formed on the image plane by the photographing lens moves in a predetermined direction parallel to the image plane; detecting the amount of movement of the movable mirror from an initial position, and the direction of movement of the movable mirror; and controlling the AF mechanism to compensate a variation of an optical path length caused by movement of the movable mirror in accordance with the amount of movement of the movable mirror and the direction thereof.

According to yet another aspect of the present invention there is provided a camera, having an image stabilizer, which includes: a camera body; a photographic lens for forming an image of an object on an image plane of the camera body; a pair of movable mirrors positioned in an optical path between the photographic lens and the image plane; a vibration sensor for detecting the magnitude of a vibration and the direction thereof given to the camera body; and a pair of mirror drive mechanisms for driving the pair of movable mirrors, respectively, so that the image formed on the image plane by the photographing lens moves in two directions perpendicular to each other, and in a direction parallel to the image plane.

Preferably, the pair of mirror drive mechanisms are made of the same mechanical structure. In this case, the pair of mirror drive mechanisms can employ the abovementioned mechanism (method) wherein the mirror is moved linearly in the direction of the incident light; or alternatively, the mechanism (method) wherein the mirror is rotated. However, it is possible to employ a combination wherein one mirror is moved linearly, and the other mirror is rotated.

Preferably, the pair of movable mirrors includes a first movable mirror for reflecting light which is incident thereon in a first direction perpendicular to an optical axis of the photographic lens; a second movable mirror for reflecting light which is reflected by the first movable mirror in a second direction perpendicular to a plane including the first direction and the optical axis of the photographic lens.

According to another aspect of the present invention, there is provided a method of controlling a camera having an image stabilizer, which includes: a camera body; a photographic lens for forming an image of an object on an image plane of the camera body; and first and second movable mirrors arranged at different positions in an optical path between the photographic lens and the image plane. The method includes: moving the first movable mirror to compensate a shaking of the image in a first direction which is caused by a vibration given to the camera body; and moving the second movable mirror to compensate a shaking of the image in a second direction which is caused by a vibration given to the camera body, the second direction being perpendicular to the first direction.

According to yet another aspect of the present invention there is provided a camera having, an image stabilizer, which includes: a camera body; an image-recording medium positioned within the camera body; a photographic lens for forming an image on the image-recording medium; a movable mirror positioned in an optical path between the photographing lens and the image-recording medium; a vibration sensor for detecting the magnitude of a vibration and the direction thereof given to the camera body; a first drive mechanism for driving the movable mirror in accordance with the magnitude of the vibration and the direction thereof; a second drive mechanism for driving the image-recording medium in a direction perpendicular to an direction of light which is incident on the image-recording medium.

With this structure, the second drive mechanism drives the image-recording medium in accordance with the magnitude of the vibration and the direction thereof, which are detected by the vibration sensor, so that image shake on the image plane is compensated, in cooperation with the movement of the movable mirror.

Preferably, a moving direction of the image on the image-recording medium according to the driving of the movable mirror by the first drive mechanism and a moving direction of the image on the image-recording medium according to the driving of the image-recording medium by the second drive mechanism are perpendicular to each other.

In an embodiment, the image-recording medium includes a film, and the second drive mechanism includes a film feed mechanism for feeding the film in the longitudinal direction thereof. In case where the film has perforations along both edges thereof, the film feed mechanism includes: a sprocket which is engaged with the perforations to move the film in a feeding direction thereof; and a device for rotating the sprocket in accordance with the magnitude of the vibration and the direction thereof, which are detected by the vibration sensor.

Alternatively, the image-recording medium includes an image pick-up device. The second drive mechanism includes a guide mechanism for guiding the image pick-up device to move in a direction parallel to a light receiving surface of the image pick-up device; and a device for moving the image pick-up device in the direction in accordance with the magnitude of the vibration and the direction thereof, which are detected by the vibration sensor.

According to another aspect of the present invention, there is provided a method of controlling a camera having an image stabilizer, which includes: a camera body; an image-recording medium positioned within the camera body; a photographic lens for forming an image of an object on the image-recording medium; and a movable mirror to reflect light which passes through the photographic lens. The method includes moving the movable mirror to compensate a shaking of the image in a first direction which is caused by a vibration given to the camera body; and moving the image-recording medium in a direction perpendicular to a direction of light which is incident on the image-recording medium to compensate a shaking of the image in a second direction which is caused by a vibration given to the camera body, the second direction being perpendicular to the first direction.

Similar to the above, the image-recording medium can be a sensitive film or an image pick-up device (CCD).

According to yet another aspect of the present invention there is provided a camera having an image stabilizer, comprising: a camera body; a photographic lens for forming an image of an object on an image plane of the camera body; a movable mirror positioned in an optical path between the photographing lens and the image plane; a vibration sensor for detecting the magnitude of a vibration and the direction thereof given to the camera body; and a mirror drive mechanism for driving the movable mirror, wherein the image formed on the image plane by the photographing lens moves on the image plane in two different predetermined directions perpendicular to each other according to the movement of the movable mirror.

In an embodiment,the mirror drive mechanism includes: a guide mechanism for linearly guiding the movable mirror to move along an incident direction of light which is incident on the movable mirror, and for supporting the movable mirror to be rotatable about a rotational axis thereof which extends parallel to light which is incident on the movable mirror; a first moving device for rotating the movable mirror in accordance with the magnitude of the vibration and the direction thereof to deflect light which is reflected by the movable mirror; and a second moving device for linearly moving the movable mirror in accordance with the magnitude of the vibration and the direction thereof to move light which is reflected by the movable mirror in a direction of movement of the movable mirror.

Alternatively, the mirror drive mechanism includes: a support mechanism for supporting the movable mirror to be rotatable about a first rotational axis thereof which extends parallel to light which is first incident on the movable mirror, and for supporting the movable mirror to be rotatable about a second rotational axis thereof which extends in a plane including the first rotational axis and second light which is reflected by the movable mirror; and a pair of moving devices for rotating the movable mirror about the pair of rotational axes, in accordance with the magnitude of the vibration and the direction thereof, to deflect light which is reflected by the movable mirror in the rotating direction of the movable mirror.

According to another aspect of the present invention, there is provided a method of controlling a camera having an image stabilizer, which includes: a camera body; a photographic lens for forming an image of an object on an image plane of the camera body; and movable mirrors positioned in an optical path between the photographic lens and the image plane. The method includes moving the movable mirror in a first direction to thereby move the image on the image plane in a first predetermined direction; and moving the movable mirror a second direction different from the first direction to thereby move the image on the image plane in a second predetermined direction, the first predetermined direction and second predetermined direction being perpendicular to each other.

Other aspects, objects and advantages of the invention will become apparent to one skilled in the art from the following disclosure and the appended claims.

The present disclosure relates to subject matter contained in Japanese Patent Applications No.10-109906, No.10-109907, No.10-109908 (all filed on Apr. 20, 1998), and No.10-170881 (filed on Jun. 18, 1998) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
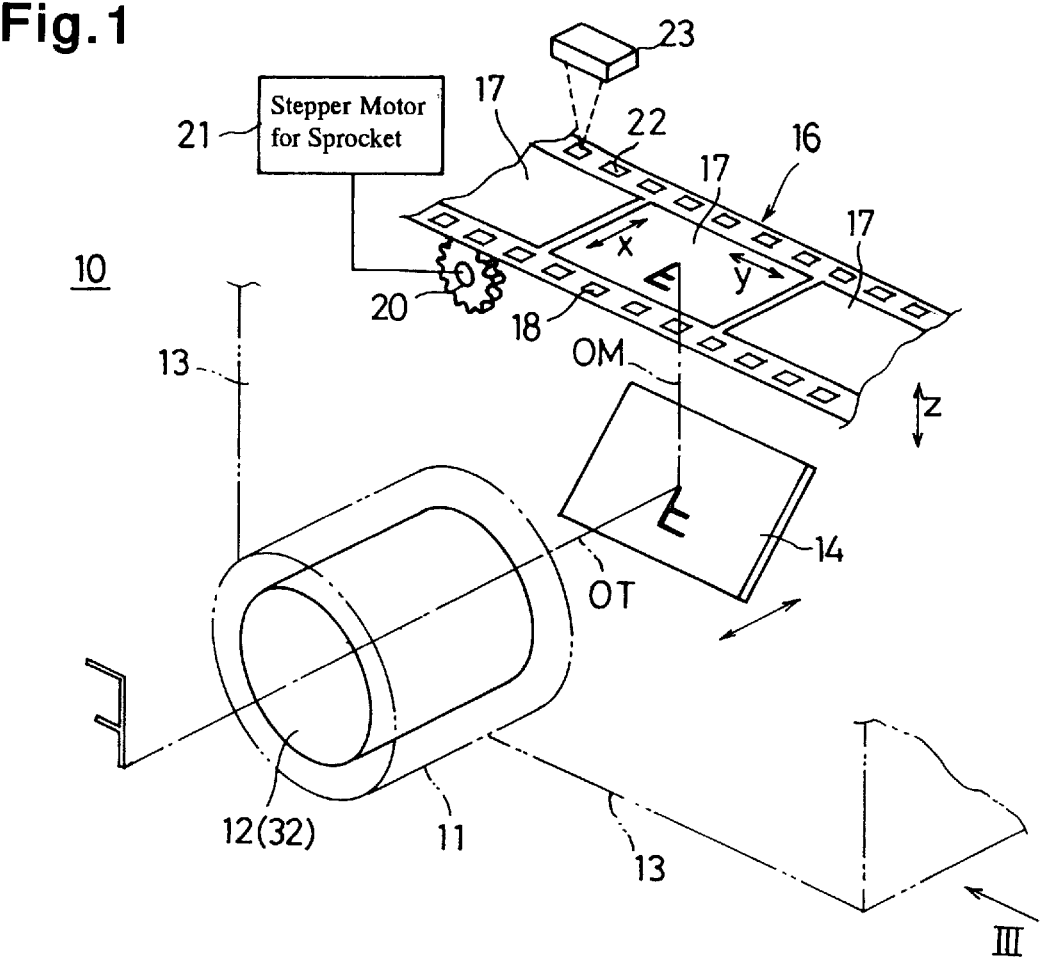
FIG. 1 is a perspective view of the first embodiment of a photographic optical system of a camera having an image stabilizer to which the present invention is applied.

FIG. 1 shows the first embodiment of photographic optical system of a camera having an image stabilizer to which the present invention is applied. The first embodiment (camera 10) is provided with a photographic lens barrel 11 and a camera body 13, which are shown by two-dot chain lines in FIG. 1. The lens barrel 11 is provided with a photographic lens group 12 therein. The camera 10 is provided therein with a movable mirror 14 behind the photographic lens group 12. The movable mirror 14 is provided thereon with a plain-reflecting surface for reflecting incident light, which passes through the photographic lens group 12 to be incident on the plain reflecting surface, upwardly in the camera body 13. Light reflected by the movable mirror 14 is incident on a film 16 (which lies on an image plane) which is positioned above the movable mirror 14. The photographic optical system has a first optical axis OT which extends from the photographic lens group 12 to the movable mirror 14 and a second optical axis OM which extends from the movable mirror 14 to a film surface of the film 16 (image plane). The first and second optical axes OT and OM extend perpendicular to each other.

Moreover, the letter 'F' shown on the movable mirror 14 shows the orientation of the image for illustration purposes, and does not mean that the image is formed on the mirror surface thereof; this is also the case for the other embodiments.

The camera 10 is provided, on each side (right and left sides) of the camera body 13 with respect to the image plane, with a film cartridge chamber (not shown) and a spool chamber (not shown). The film 16, which is drawn out of a film cartridge positioned in the film cartridge chamber to be wound by a take-up spool positioned in the spool chamber, passes a film path between the film cartridge chamber and the spool chamber so that each frame 17 of the film 16 lies on the image plane when the frame is ready to be exposed. As can be seen from the arrangement of the photographic optical system shown in FIG. 1, in the first embodiment (camera 10), the rectangular frames 17 of the film 16 lie on a horizontal plane of the camera 10 to extend in the right and left direction of the camera 10, rather than on a vertical plane of the camera 10.

In FIG. 1, an arrow "x" represents the vertical direction (shorter-side direction) of the frame 17 which lies on the image plane, while an arrow "y" represents the horizontal direction (longer-side direction) of the same. In the case where the photographic lens group 12 shakes in the vertical direction of the camera 10 due to unstable movement thereof, to thereby cause the first optical axis OT to shake, an image formed on the image plane (sensitive surface of the frame 17) via the photographic lens group 12 and the movable mirror 14 shakes in the vertical direction "x" on the image plane. Similarly, in the case where the photographic lens group 12 shakes in the horizontal direction of the camera 10 due to unstable movement thereof, to thereby cause the first optical axis OT to shake, an image formed on the image plane via the photographic lens group 12 and the movable mirror 14 shakes in the horizontal direction "y" on the image plane.

In the present embodiment, although the camera 10 uses a light sensitive film, e.g., 35 mm film, such a film can be replaced by an image pick-up device such as a CCD (charge-coupled device). Namely, the present invention can be applied not only to a camera using a light sensitive film but also to a digital still camera using an image pick-up device.

The film is provided on each edge thereof with first and second perforations 18 and 22 which are formed at regular intervals. A sprocket 20 is engaged with the first perforation 18. The sprocket 20 is driven by a first stepper motor 21 in forward and reverse rotational directions to move the film 16 forwardly and reversely, respectively, in the horizontal direction "y" of the frame 17. In this embodiment, the film feeding mechanism (the sprocket 20 and the first stepper motor 21) is used for compensating the shaking of an image formed on the film surface in predetermined direction (horizontal direction), as discussed herein.

The camera 10 is provided therein adjacent to the perforations 22 with a first photosensor 23 for counting the perforations 22 to determine the amount of feeding of the film 16. A CPU 40 outputs a drive signal which contains the number of pulses to the first stepper motor 21 via a motor driver 39 for compensating the image-shake (see FIG. 4).

Figure 2:
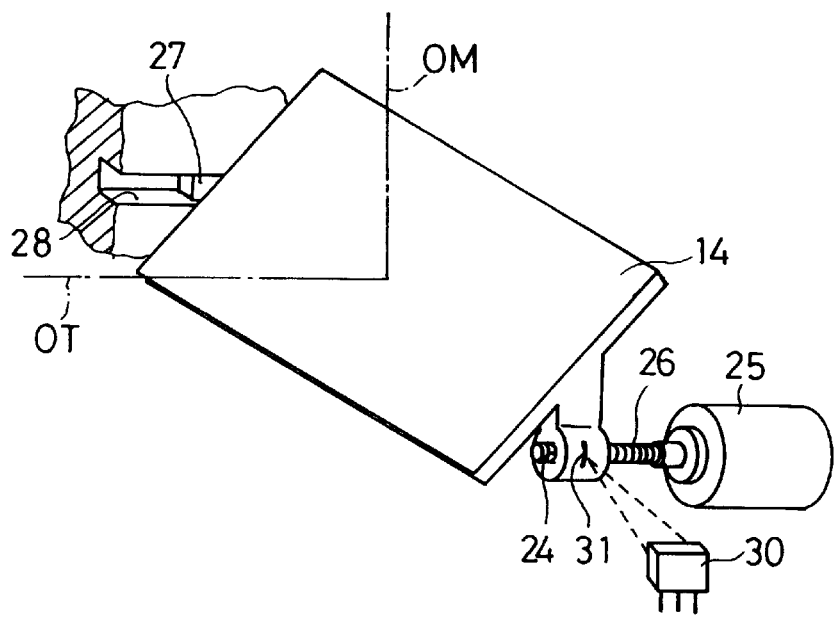
FIG. 2 is a perspective view of a drive mechanism for linearly moving a movable mirror positioned in the camera body of the first embodiment of the camera in a direction parallel to an optical axis of a photographic lens.

The movable mirror 14 is supported in the camera body 13 to be linearly movable in the direction of the first optical axis OT without varying the angle of reflection. FIG. 2 shows an embodiment of the drive mechanism for driving the movable mirror 14. The movable mirror 14 is provided on one side thereof with a screw hole 24 having a female screw thread on the inner peripheral surface thereof. The camera 10 is provided adjacent to the movable mirror 14 with a second stepper motor 25 having a drive shaft 26. The drive shaft 26 extends in a direction parallel to the first optical axis OT and is engaged with the screw hole 24. The drive shaft 26 is provided thereon with a male screw thread. The movable mirror 14 is provided, on the side opposite to the screw hole 24, with a guide projection 27 which is slidably fitted in a guide rail 28 formed on a stationary member in the camera body 13. The guide rail 28 extends in a direction parallel to the first optical axis OT to guide the movable mirror 14 along the first optical axis OT.

With the drive mechanism having such a structure, rotating the drive shaft 26 of the second stepper motor 25 in forward and reverse directions causes the movable mirror 14 to move in forward and rearward directions along the first optical axis OT while maintaining the angle of reflection of the movable mirror 14. The movable mirror 14 is provided thereon with a marking 31. The camera 10 is provided adjacent to the movable mirror 14 with a second photosensor 30 for detecting the marking 31. Specifically, the second photosensor 30 detects whether or not the movable mirror 14 is positioned at the predetermined initial position thereof by detecting the marking 31. The amount of driving and the driving direction of the movable mirror 14 are determined as a number of pulses by the CPU 40. The CPU 40 outputs a drive signal which contains the number of pulses to the second stepper motor 25 via the motor driver 39. Accordingly, the position of the movable mirror 14 with respect to the initial position thereof (i.e., the amount of driving of the movable mirror 14 from the initial position thereof and the driving direction of the movable mirror 14) can be detected by referring to the number of pulses contained in the drive signal input to the second stepper motor 25.

When the movable mirror 14 is driven along the first optical axis OT, the second optical axis OM moves in the same direction, so that an image formed on the frame 17 moves in the vertical direction "x" thereof. In the illustrated photographic optical system, moving the movable mirror 14 forwards (in the left direction as viewed in FIG. 3) causes the image formed on the frame 17 to move in the same direction, i.e., towards the upper side of the frame 17. Likewise, moving the movable mirror 14 rearward (in the right direction as viewed in FIG. 3) causes the image formed on the frame 17 to move in the same direction, i.e., towards the lower side of the frame 17.

In the case where the photographic lens group 12 shakes vertically due to unstable movement thereof, to thereby cause the first optical axis OT to shake, an image formed on the image plane (sensitive surface of the frame 17) also shakes in the vertical direction "x" on the image plane. To prevent the image formed on the image plane from shaking in the vertical direction "x", the movable mirror 14 is driven in directions opposite to the shaking directions of the image by the same amount to offset the shaking.

In the case where the photographic lens group 12 shakes horizontally due to unstable movement thereof, to thereby cause the first optical axis OT to shake, an image formed on the image plane (sensitive surface of the frame 17) also shakes in the horizontal direction "y" on the image plane. To prevent the image formed on the image plane from shaking in the horizontal direction "y", the film 16 is driven by the first stepper motor 21 via the sprocket 20 along the horizontal direction "y" in directions opposite to the shaking directions of the image by the same amount of shaking to offset the shaking.

Driving the movable mirror 14 and the film 16 to move at the same time in an appropriate manner makes it possible to compensate the shaking of an image formed on the film surface in the horizontal and vertical directions "x" and "y" by moving the image formed on the film surface in a composite direction of the horizontal and vertical directions "x" and "y" when the camera 10 shakes in a direction perpendicular to the first optical axis OT. The movable mirror 14, the sprocket 20, the first stepper motor 21, the first photosensor 23, the second stepper motor 25, the second photosensor 30, the guide projection 27 and the guide rail 28 are fundamental elements which constitute an image stabilizer of the camera 10. The way of controlling the movable mirror 14 and the film 16 will be discussed hereinafter.

Figure 4:
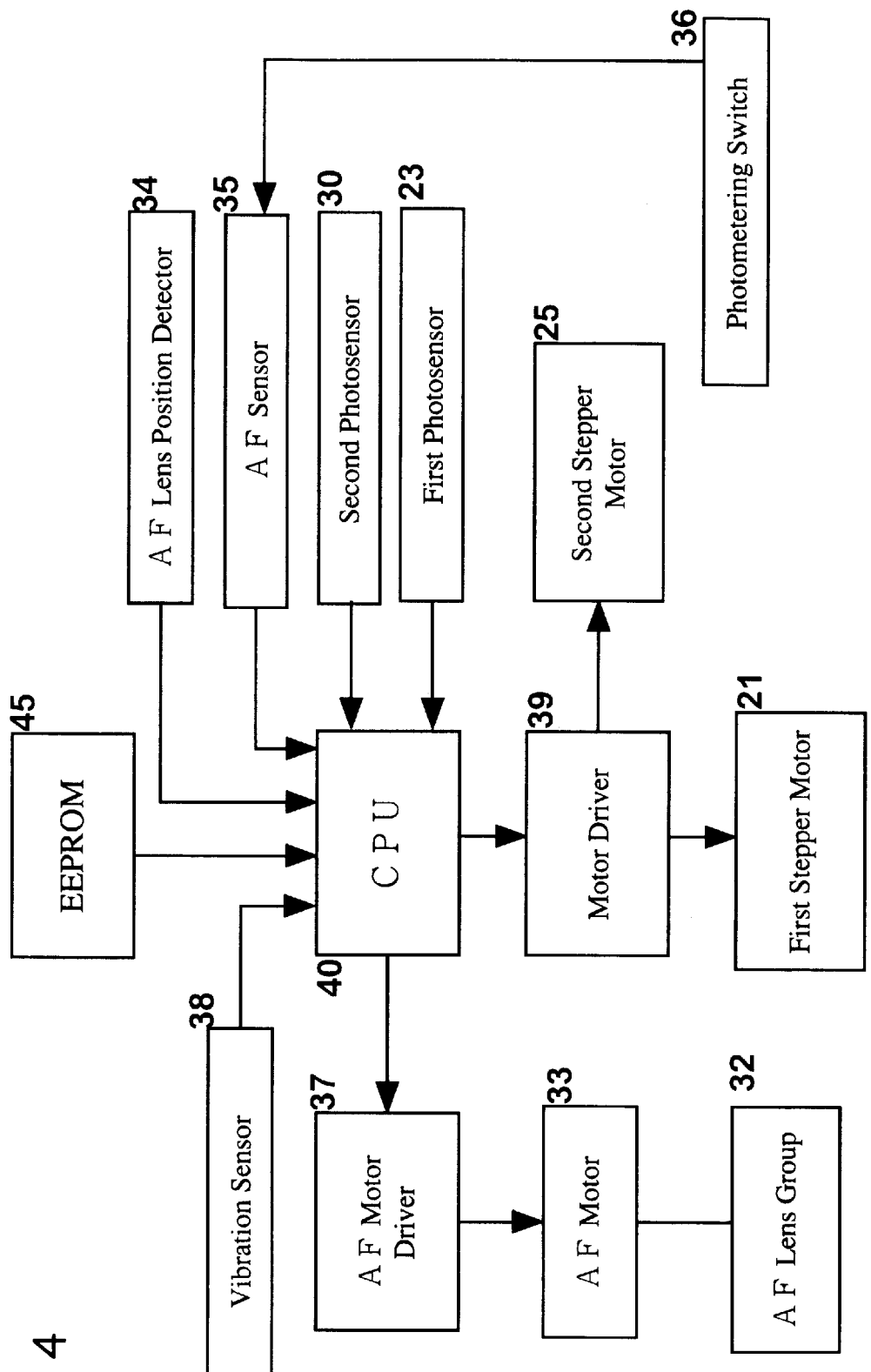
FIG. 4 is a block diagram showing an embodiment of a control system of the first embodiment of the camera.

Referring to FIG. 4, the camera 10 is provided with an AF (auto focus) mechanism, so that the photographic lens group 12 includes an AF lens group (focusing lens group) 32 which is movable along the first optical axis OT. The AF lens group 32 is driven to move by an AF motor 33 to any one of a predetermined plurality of axial positions along the first optical axis OT, and the axial position of the AF lens group 32 is detected by an AF lens position detector 34.

The camera 10 is provided with an AF sensor 35 to obtain object distance information. The AF sensor 35 is actuated to obtain such information when a photometering switch 36 is turned ON. The AF sensor 35 can be a conventional type of AF sensor, e.g., a conventional type of sensor for determining the object distance, or a conventional type of sensor for determining the amount of defocus. The photometering switch 36 is turned ON when (for example) a release button (not shown) of the camera 10 is half depressed. Object distance information obtained using the AF sensor 35 is input to the CPU 40 and subsequently the CPU 40 determines an axial position to which the AF lens group 32 is to be moved, to bring an object into focus (or the amount of driving of the AF lens group 32 from the current axial position thereof, which is currently detected by the AF lens position detector 34, to another axial position at which an in-focus state is obtained). Thereafter the CPU 40 outputs a drive signal which corresponds to the determined axial position or the determined amount of driving of the AF lens group 32 to an AF motor driver 37 connected to the CPU 40. Upon receiving the drive signal from the AF motor driver 37, the AF motor 33 drives the AF lens group 32 to move to the determined axial position to thereby obtain an in-focus state.

Control for stabilizing an image formed on the image plane of the camera 10 will be hereinafter discussed. The camera 10 is provided therein with a vibration sensor 38 for sensing the angular speed of the camera 10 about each of the up-down axis and the right-left axis of the camera body 13. These two axes extend perpendicular to each other in a plane normal to the first optical axis OT. The magnitude and direction of the vibration of the camera 10 are determined using the vibration sensor 38. The vibration sensor 38 can be comprised of a pair of sensors: a vertical-vibration sensor and a horizontal-vibration sensor. Each of the vertical and horizontal sensors can be a conventional gyro sensor. The vertical-vibration sensor exclusively senses the shake of the camera 10 in the vertical direction, while the horizontal-vibration sensor exclusively senses the shake of the camera 10 in the horizontal direction.

As mentioned above, an image formed on the frame 17 moves thereon in the vertical direction "x" thereof when the movable mirror 14 is driven to move along the first optical axis OT, while an image formed on the frame 17 moves thereon in the horizontal direction "y" thereof when the film 16 is driven to move in the horizontal direction "y" thereof (i.e., the winding/rewinding direction). With this structure, the CPU 40 first calculates an angle of movement by evaluating the time quadrature of the angular speeds of a shake in the vertical and horizontal directions. Thereafter, based on the evaluated angle of movement, the CPU 40 calculates the amount of movement of the image on the image plane in the vertical and horizontal directions "x" and "y". Furthermore, based on the calculated amount of movement of the image, the CPU calculates the necessary amount and direction of driving of the movable mirror 14 and also the necessary amount and direction of driving of the film 16 to offset the shaking of the image on the image plane. In the present embodiment, a data table (first data table) containing information on the relationship between the angular speed of the camera body 13 and the necessary amount of driving of the movable mirror 14 (the number of drive pulses for the second stepper motor 25) and also information on the relationship between the angular speed and the necessary amount of driving of the film 16 (the number of drive pulses for the first stepper motor 21), for compensating the shaking of an image formed on the image plane, is pre-stored in an EEPROM 45 connected with the CPU 40. The CPU 40 inputs information of the necessary amount of driving of the movable mirror 14 and the film 16 from the first data table stored in the EEPROM 45 for compensating the shaking of an image formed on the image plane so that the motor driver 39 outputs drive signals corresponding to the input information to the first and second stepper motors 21 and 25 to drive the movable mirror 14 and the film 16, respectively. Consequently, the movable mirror 14 and the film 16 are each driven in an appropriate direction by an appropriate amount of driving to compensate image shake, thereby an image formed on the frame 17 is stabilized.

Figure 3:
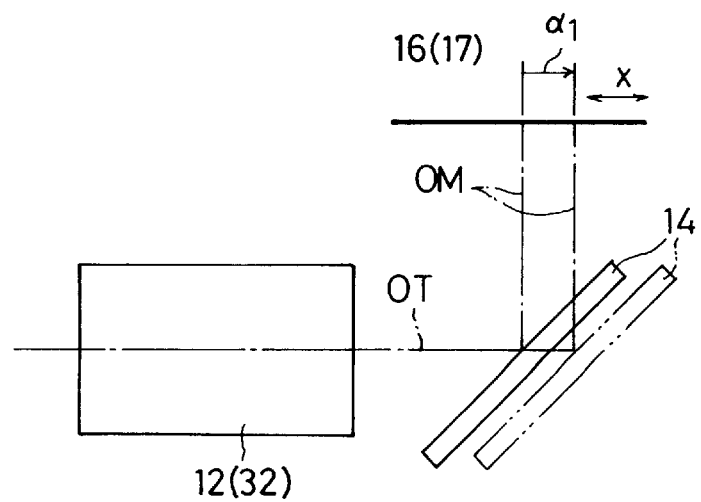
FIG. 3 is a side view of the photographic optical system shown in FIG. 2, showing a variation of an optical path when the movable mirror is linearly moved in an optical axis direction of a photographic lens by the drive mechanism shown in FIG. 2, viewed from a direction shown by an arrow III in FIG. 1.

In the case where the movable mirror 14 is driven to move rearward along the first optical axis OT from the initial position thereof to compensate image shake in the vertical direction "x" (e.g., from the initial position shown by a solid line to the position shown by a two-dot chain line in FIG. 3 by an amount of driving $\alpha_1$) the optical path length from the rear end of the photographic lens group 12 to the film 16 increases by the same amount $\alpha_1$, which makes an image formed on the frame 17 out-of-focus. To prevent such a problem from occurring, the AF operation is carried out by the aforementioned AF mechanism with consideration of the variation (amount of change) of the optical path length caused by the movement of the movable mirror 14.

In addition to the aforementioned first data table (data table for compensating image shake), another data table (second data table) containing different AF compensation values for compensating the variation of the optical path length caused by the movement of the movable mirror 14 in the AF operation is pre-stored in the EEPROM 45. The amount of driving of the movable mirror 14 from the initial position thereof and also the direction of driving of the movable mirror 14 can be detected by referring to the number of pulses contained in the drive signal input to the second stepper motor 25, so that the CPU 40 selects an appropriate AF compensation value, which corresponds to the variation of the optical path length caused by the movement of the movable mirror 14 in the AF operation, from the second data table by referring to the first data table. Taking this selected AF compensation value into account, the CPU 40 adjusts the amount of driving of the AF lens group 32 which is determined based on the object distance information to thereby determine the drive signal for driving the AF lens group 32. The CPU 40 outputs this drive signal to the AF motor driver 37 for driving the AF motor 33. An in-focus position of the AF lens group 32 on the optical axis thereof (i.e., the first optical axis OT) is determined by utilizing the data of the current axial position of the AF lens group 32 which is detected by the AF lens position detector 34 so that the drive signal which is output from the AF motor driver 37 to be input to the AF motor 33 to move the AF lens group 32 to the in-focus position thereof corresponds to the amount of movement of the AF lens group 32 from the current axial position to the in-focus position thereof. The AF lens group 32 is driven to the in-focus position thereof, which is determined by the control, when the focusing operation is carried out.

Controlling the photographic optical system of the camera 10 in the aforementioned manner makes it possible to maintain an in-focus state (i.e., maintain the image plane to be positioned on the currently-set frame 17) upon taking a photograph, even if the movable mirror 14 moves along the first optical axis OT to thereby vary the optical path length. Although the aforementioned discussion regarding the AF operation is directed to the particular case shown in FIG. 3 where the movable mirror 14 is driven rearward, the aforementioned AF operation can of course be carried out in a case where the movable mirror 14 is driven forwards from the initial position thereof.

Figure 5:
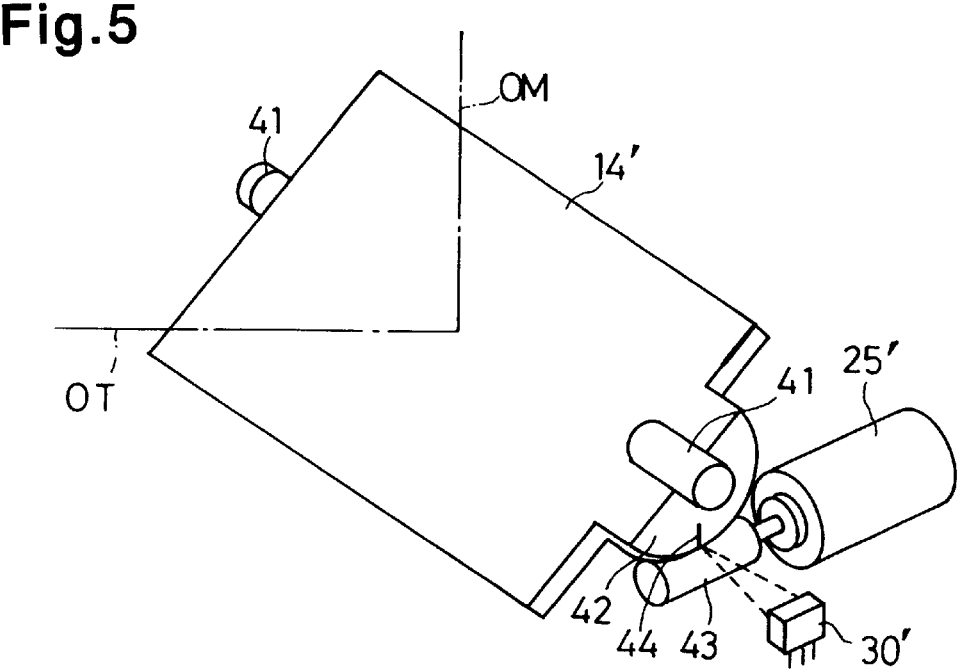
FIG. 5 is a perspective view of a drive mechanism for rotating a movable mirror positioned in the camera body of the first embodiment of the camera.

FIG. 5 shows another embodiment of the drive mechanism for driving a movable mirror 14' which corresponds to the movable mirror 14. The movable mirror 14' is provided on right and left sides thereof with two coaxial shafts 41 which are rotatably supported by a stationary member (not shown) in the camera body 13. The movable mirror 14' is rotatable about the shafts 41. The movable mirror 14' is provided about one of the shafts 41 with a semicircular worm wheel 42. A stepper motor 25' is positioned adjacent to the movable mirror 14'. The stepper motor 25' is provided on a drive shaft thereof with a worm 43 which meshes with the worm wheel 42. With this structure, rotating the worm 43 by driving the stepper motor 25' in forward and reverse directions causes the movable mirror 14' to rotate in forward and reverse rotational directions about the shafts 41. When the movable mirror 14' is positioned at the initial position thereof, the reflecting surface of the movable mirror 14' is inclined to the first optical axis OT by an angle of 45 degrees, i.e., the angle of reflection of incident light on the movable mirror 14' is 90 degrees. The movable mirror 14' is provided on a side of the worm wheel 42 with a marking 44.

A photosensor 30' for detecting the marking 44 is positioned adjacent to the movable mirror 14'. The photosensor 30' detects whether or not the movable mirror 14' is positioned at the predetermined initial rotational position thereof by detecting the marking 44. The rotational position of the movable mirror 14' with respect to the initial rotational position thereof (i.e., the amount of driving of the movable mirror 14' from the initial rotational position thereof and the rotational direction of the movable mirror 14') can be detected by referring to the number of pulses contained in the drive signal input to the stepper motor 25'.

Figure 6:
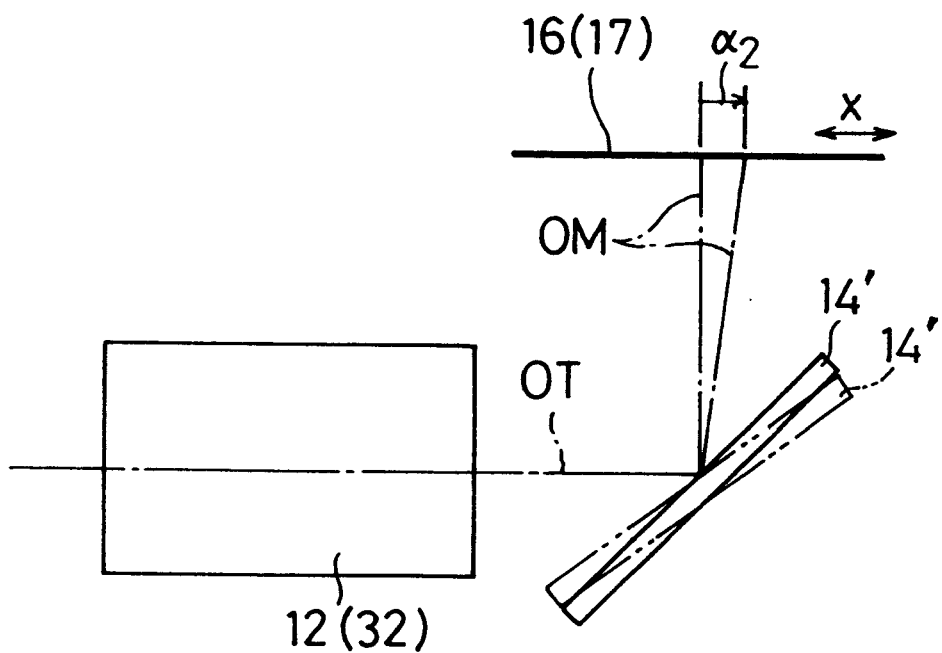
FIG. 6 is a side view of the photographic optical system shown in FIG. 5, showing a variation of an optical path when the movable mirror is rotated by the drive mechanism shown in FIG. 5, viewed from a direction shown by an arrow III in FIG. 1.

In the case where the movable mirror 14' is driven to rotate from the initial position thereof to compensate image shake in the vertical direction "x" (e.g., from the initial position shown by a solid line to the position shown by a two-dot chain line in FIG. 6) the light reflected by the movable mirror 14' to be incident upon the frame 17 is deflected in the vertical direction "x" of the frame 17 by the amount of displacement $\alpha_2$. Accordingly, the drive mechanism shown in FIG. 2 can be replaced by the drive mechanism shown in FIG. 5 to compensate the shaking of the camera 10 in the vertical direction thereof. In this case using the drive mechanism shown in FIG. 5, the first data table stored in the EEPROM 45 needs to be prepared for the movable mirror 14', which is rotatable about the shafts 41.

In this case using the drive mechanism shown in FIG. 5, as can be seen in FIG. 5, the optical path length from the rear end of the photographic lens group 12 to the film 16 is shortest when the movable mirror 14' is in the initial rotational position thereof, and the optical path length increases as the amount of rotation of the movable mirror 14' from the initial rotational position thereof increases, which makes an image formed on the frame 17 out-of-focus. To prevent such a problem from occurring, the AF operation is carried out by the aforementioned AF mechanism with consideration of the variation of the optical path length caused by the rotational movement of the movable mirror 14', similar to the case using the movable mirror 14 shown in FIG. 2.

The ratio of the variation in the optical path length from the rear end of the photographic lens group 12 to the film 16 to the amount of rotation of the movable mirror 14' from the initial rotational position thereof can be calculated based on the optical performance and relative positions of optical elements of the photographic optical system, wherein the second data table which contains AF compensation values for compensating the variation of the optical path length caused by the rotational movement of the movable mirror 14' in the AF operation needs to be pre-stored in the EEPROM 45. For instance, since the amount of rotational driving of the movable mirror 14' for moving an image formed on the frame 17 by an amount of driving $\alpha_2$ in the vertical direction "x" of the frame 17 (see FIG. 6) can be detected by referring to the number of pulses contained in the drive signal input to the stepper motor 25', the CPU 40 selects an appropriate AF compensation value, which corresponds to the variation of the optical path length caused by the rotational movement of the movable mirror 14' in the AF operation, from the second data table by referring to the first data table. Taking this selected AF compensation value into account, the CPU 40 adjusts the amount of driving of the AF lens group 32 which is determined using the object distance information to thereby determine the drive signal for driving the AF lens group 32. The CPU 40 outputs this drive signal to the AF motor driver 37 for driving the AF motor 33. Controlling the photographic optical system of the camera 10 in such a manner makes it possible to maintain an in-focus state upon taking a photograph, even if the movable mirror 14' rotates about the shafts 41, similar to the case using the movable mirror 14 shown in FIG. 2.

Figure 7:
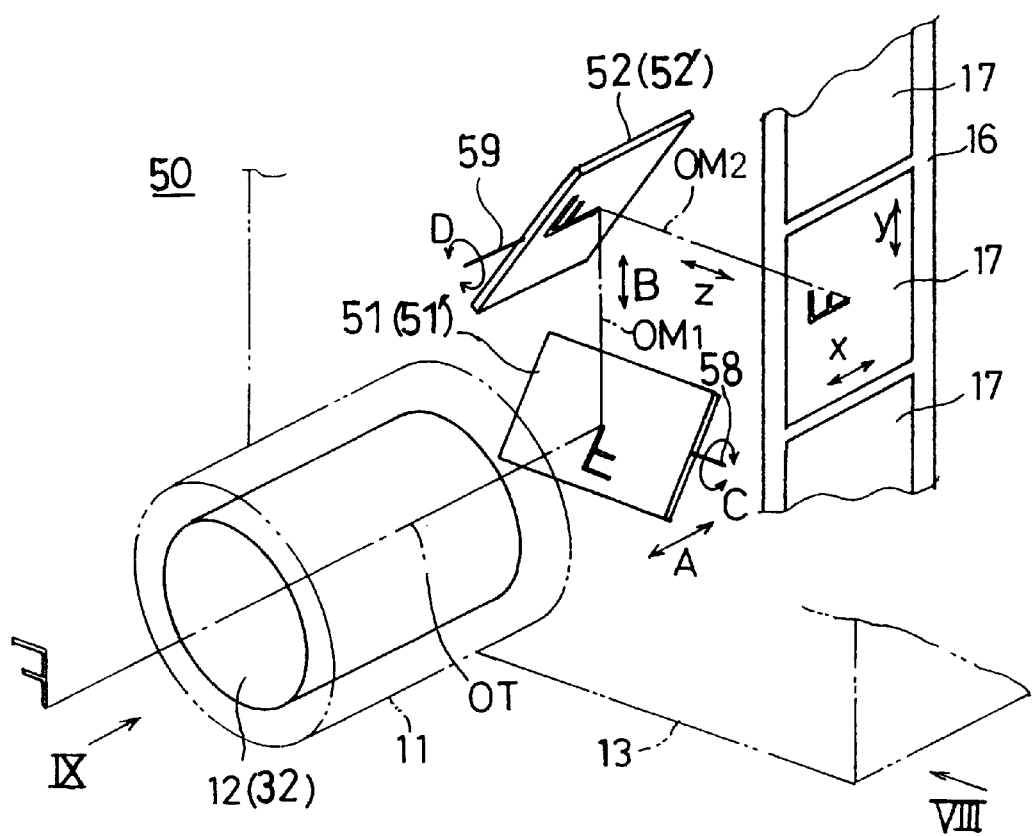
FIG. 7 is a perspective view of the second embodiment of a photographic optical system of a camera having an image stabilizer to which the present invention is applied.

FIG. 7 shows the second embodiment of photographic optical system of a camera 50 having an image stabilizer to which the present invention is applied. Elements or components similar to those in the first embodiment are designated by the same reference numerals.

The second embodiment (camera 50) is provided in the camera body 13 thereof with a pair of movable mirrors, i.e. first and second movable mirrors 51 and 52. The main feature of the second embodiment is that an image formed on the image plane (frame 17) is driven to move thereon in an appropriate direction by moving each of the first and second movable mirrors at the same time to compensate the shaking of an image on the image plane.

The first movable mirror 51 reflects the incident light, which passes through the photographic lens group 12 to be incident on the first movable mirror 51, upwardly in the camera body 13 by an approximate right angle. The second movable mirror 52, positioned above the first movable mirror 51 in the camera body 13, reflects the incident light to the right as viewed from the front of the camera 50 by an approximate right angle.

The first movable mirror 51 is supported and driven by a drive mechanism which is similar to the drive mechanism for driving the movable mirror 14 shown in FIG. 2, to be linearly movable in the direction of a first optical axis OT (shown by an arrow "A" in FIG. 7) without varying the angle of reflection. On the other hand, the second movable mirror 52 is supported and driven by a drive mechanism which is similar to the drive mechanism for driving the movable mirror 14 shown in FIG. 2, to be linearly movable in the direction of a second optical axis $OM_1$ (shown by an arrow "B" in FIG. 7) without varying the angle of reflection.

In the camera 50 (the second embodiment), the image plane on which an image is focused is positioned on the right side of the first and second movable mirrors 51 and 52 in the camera body 13 as viewed from the front of the camera body 50 so that the second movable mirror 52 reflects the incident light to the frame 17 which lies on the image plane. Accordingly, the photographic optical system of the camera 50 has the aforementioned first optical axis OT which extends from the photographic lens group 12 to the first movable mirror 51, the aforementioned second optical axis $OM_1$ which extends from the first movable mirror 51 to the second movable mirror 52, and a third optical axis $OM_2$ which extends from the second movable mirror 52 to the frame 17 (image plane). The first, second and third optical axes OT, $OM_1$ and $OM_2$ extend in different directions perpendicular to one another. The film 16 drawn out of a film cartridge (not shown) is fed to a spool chamber (not shown) in the vertical direction of the camera body 13 so that each frame 17 passes the image plane. In the second embodiment, although the camera 50 is of a type using a light sensitive film, e.g., 35 mm film, such a film can be replaced by an image pick-up device such as a CCD (charge-coupled device)

In the second embodiment the vertical direction "x" of the frame 17 of the film 16 which lies on the image plane corresponds to the front-rear direction of the camera body 13 (i.e., the direction of the first optical axis OT), while the horizontal direction "y" of the frame 17 of the film 16 which lies on the image plane corresponds to the vertical direction of the camera body 13 (i.e., the direction of the second optical axis $OM_1$). Therefore, in the case where the photographic lens group 12 shakes in the vertical direction of the camera 50 due to unstable movement thereof, to thereby cause the first optical axis OT to shake, an image formed on the image plane (sensitive surface of the frame 17) shakes in the vertical direction "x" of the frame 17 on the image plane. On the other hand, in the case where the photographic lens group 12 shakes in the horizontal direction of the camera 50 due to unstable movement thereof, to thereby cause the optical axis OT to shake, an image formed on the image plane shakes in the horizontal direction "y" of the frame 17 on the image plane.

The camera 50 is provided therein with first and second photosensors 53 and 54 (see FIG. 12), which are each similar to the photosensor 30 shown in FIG. 2. The first and second photosensors 53 and 54 detect whether or not the first and second movable mirrors 51 and 52 are positioned at predetermined initial positions thereof, respectively. The camera 50 is provided therein adjacent to the first and second movable mirrors 51 and 52 with first and second stepper motors 55 and 56, which are each similar to the stepper motor 25 shown in FIG. 2. The CPU 40 controls the first and second stepper motors 55 and 56 via a motor driver 57 to move the first and second movable mirrors 51 and 52 along the first optical axis OT and the second optical axis $OM_1$, respectively. In other words, the first and second movable mirrors 51 and 52 are each controlled to move by an amount corresponding to the number of pulses contained in the drive signal which is input to the corresponding stepper motors 55 and 56, respectively. Accordingly, the position of each movable mirror 51 and 52 with respect to the initial position thereof (i.e., the amount of driving of each movable mirror from the initial position thereof and the driving direction of each movable mirror) can be detected by referring to the number of pulses contained in the drive signal input to the corresponding stepper motor 55 or 56.

Figure 8:
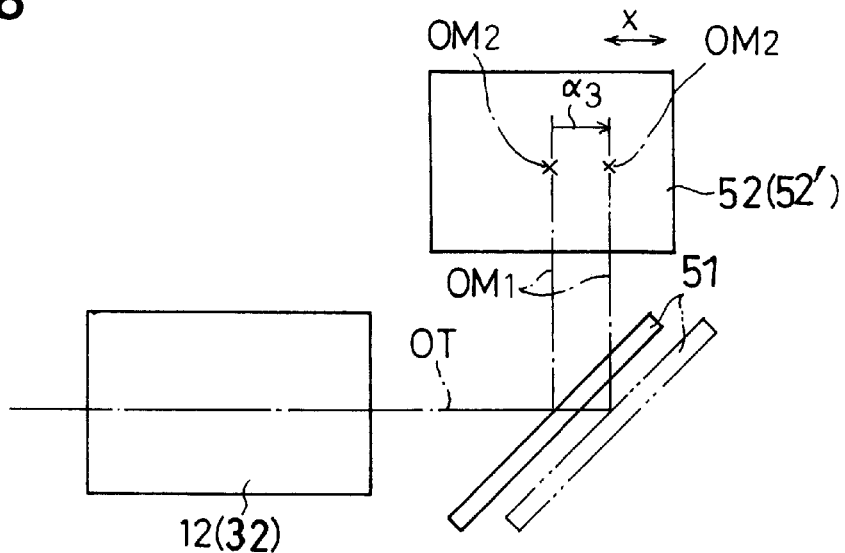
FIG. 8 is a side view of the photographic optical system shown in FIG. 7, showing a variation of an optical path when the first movable mirror shown in FIG. 7 is linearly moved in an optical axis direction, viewed from a direction shown by an arrow VIII in FIG. 7.
Figure 9:
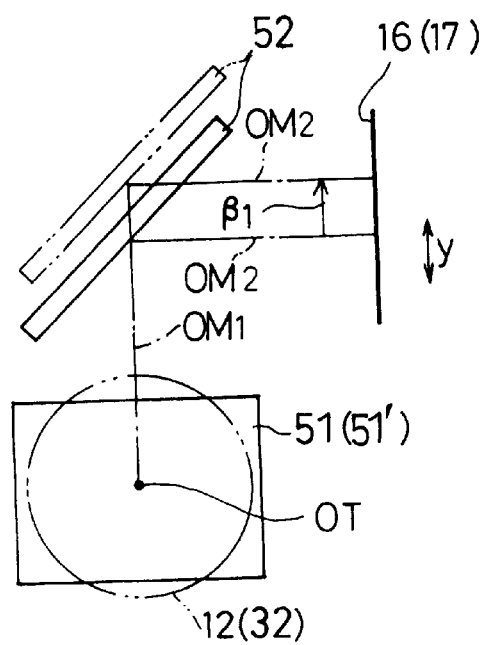
FIG. 9 is a side view of the photographic optical system shown in FIG. 7, showing a variation of the optical path when the second movable mirror shown in FIG. 7 is linearly moved in the optical axis direction, viewed from a direction shown by an arrow IX in FIG. 7.

As can be seen in FIG. 8, moving the first movable mirror 51 along the direction of the first optical axis OT causes the incident position of the upper tip of the second optical axis $OM_1$ on the second movable mirror 52 to move in the forward-rearward direction of the camera body 13, i.e., in the direction parallel to the first optical axis OT. This causes an image formed on the frame 17 to move in the vertical direction "x" thereof. Furthermore, as can be seen in FIG. 9, moving the second movable mirror 52 along the direction of the second optical axis $OM_1$ causes the position of an image formed on the frame 17 to move in the vertical direction of the camera body 13, i.e., in the horizontal direction "y" of the frame 17. With such operation of the drive mechanism, the shaking of an image formed on the frame 17 can be stabilized by controlling the rotational movement of each movable mirrors 51 and 52 in the directions "x" and "y" in an appropriate manner to compensate the shaking of the image.

The first and second movable mirrors 51 and 52 of the camera 50 can be replaced by first and second movable mirrors 51' and 52', respectively, to achieve the same image stabilizing function. The first movable mirror 51' is supported in the camera body 13 to be rotatable about a first rotational shaft 58, similar to the movable mirror 14' shown in FIG. 5. The first movable mirror 51' is driven by a first stepper motor 55' (see FIG. 12) to rotate about the first rotational shaft 58 in a rotational direction shown by an arrow "C" in FIG. 7. Similarly, the second movable mirror 52' is supported in the camera body 13 to be rotatable about a second rotational shaft 59 which is positioned above the first rotational shaft 58 to extend in a direction perpendicular to the direction of the first rotational shaft 58. The second movable mirror 52' is driven by a second stepper motor 56' (see FIG. 12) to rotate about the second rotational shaft 59 in a rotational direction shown by an arrow "D" in FIG. 7.

When the first movable mirror 51' is positioned at the initial position thereof, the reflecting surface of the first movable mirror 51' is inclined with respect to the first optical axis OT by an angle of 45 degrees, i.e., the angle of reflection of incident light on the first movable mirror 51' is 90 degrees. A first photosensor 53' (see FIG. 12) detects whether or not the first movable mirror 51' is positioned at the initial rotational position thereof by detecting a marking (not shown) which is formed on the first movable mirror 51' in a manner similar to the marking 44 shown in FIG. 5. The rotational position of the first movable mirror 51' with respect to the initial rotational position thereof (i.e., the amount of driving of the first movable mirror 51' from the initial rotational position thereof and the rotating direction of the first movable mirror 51') can be detected by referring to the number of pulses contained in the drive signal input to the first stepper motor 55'.

When the second movable mirror 52' is positioned at the initial position thereof, the reflecting surface of the second movable mirror 52' is inclined to the second optical axis $OM_1$ by an angle of 45 degrees (i.e., the angle of reflection of incident light on the second movable mirror 52' is 90 degrees with respect to the second optical axis $OM_1$ extending substantially perpendicular to the first optical axis OT. A second photosensor 54' (see FIG. 12) detects whether or not the second movable mirror 52' is positioned at the initial rotational position thereof by means of detecting a marking (not shown) which is formed on the second movable mirror 52' in a manner similar to the marking 44 shown in FIG. 5. The rotational position of the second movable mirror 52' with respect to the initial rotational position thereof (i.e., the amount of driving of the second movable mirror 52' from the initial rotational position thereof and the rotating direction of the second movable mirror 52') can be detected by referring to the number of pulses contained in the drive signal input to the second stepper motor 56'.

Figure 10:
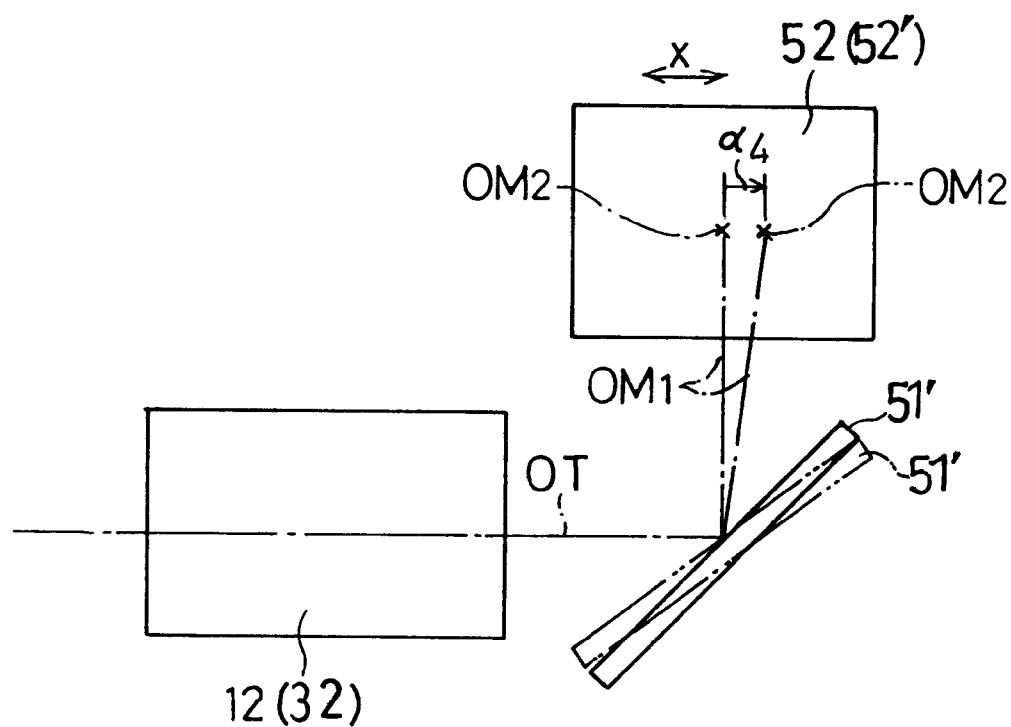
FIG. 10 is a side view of the photographic optical system shown in FIG. 7, showing a variation of an optical path when the first movable mirror shown in FIG. 7 is rotated, viewed from a direction shown by an arrow VIII in FIG. 7.

In the case where the first movable mirror 51' is driven to rotate about the first rotational shaft 58, the light reflected by the first movable mirror 51' to be incident on the second movable mirror 52' is deflected in the front-rear direction of the camera body 13, i.e., in the direction parallel to the first optical axis OT. This makes an image formed on the frame 17 move in the vertical direction "x" thereof. For instance, in the particular case shown in FIG. 10, when the first movable mirror 51' rotates from the position shown by a solid line to the position shown by a two-dot chain line, the light reflected by the first movable mirror 51' to be incident on the second movable mirror 52' is deflected in the vertical direction "x" of the frame 17 by the amount of displacement $a_4$.

Similarly, in the case where the second movable mirror 52' is driven to rotate about the second rotational shaft 59, the angle of reflection of the second movable mirror 52' varies (i.e., the angle of the third optical axis $OM_2$ with respect to the second optical axis $OM_1$ varies), so that the light reflected by the second movable mirror 52' to be incident on the frame 17 is deflected in the vertical direction of the camera body 13. This makes an image formed on the frame 17 move in the horizontal direction "y" thereof. For instance, in the particular case shown in FIG. 11, when the second movable mirror 52' rotates from the position shown by a solid line to the position shown by a two-dot chain line, the light reflected by the second movable mirror 52' to be incident on the frame 17 is deflected in the horizontal direction "y" of the frame 17 by the amount of displacement $\beta_2$.

Hence, the shaking of an image formed on the frame 17 in the vertical direction "x" thereof can be compensated by rotating the first movable mirror 51' so as to move the image on the frame 17 (or on a light receiving surface in the case of using an image-pickup device) in the direction opposite to the direction of the shaking of the image by the same amount. Likewise, the shaking of an image formed on the frame 17 in the horizontal direction "y" thereof can be compensated by rotating the second movable mirror 52' so as to move the image on the frame 17 (or on a light receiving surface in the case of using an image-pickup device) in the direction opposite to the direction of the shaking of the image by the same amount.

As can be seen from the foregoing, in the camera 50 shown in FIG. 7, an image formed on the frame 17 moves in the vertical direction "x" thereof when either one of the first movable mirrors 51 or 51' is driven, while an image formed on the frame 17 moves in the horizontal direction "y" thereof when any one of the second movable mirrors 52 or 52' is driven. Therefore, not only the first drive mechanism composed of the first and second movable mirrors 51 and 52 or the second drive mechanism composed of the first and second movable mirrors 51' and 52', also a third drive mechanism composed of the first and second movable mirrors 51 and 52' or a fourth drive mechanism composed of the first and second movable mirrors 51' and 52 can be adopted for the camera 50 to have the same effect. However, adopting the first or second drive mechanism, which is composed of similar components (i.e., having the same mechanical structure), is preferable to reduce the cost of production.

Primary controls for the first and second movable mirrors of the first through fourth drive mechanisms are the same, and hence the first and second movable mirrors of any one of the first through fourth drive mechanisms can be controlled in a manner similar to the manner in the previous embodiment. For example, in the case of the first drive mechanism, which is composed of the first and second movable mirror 51 and 52, the CPU 40 obtains the amount of driving and the driving direction of the first movable mirror 51 and the amount of driving and the driving direction of the second movable mirror 52 from the EEPROM 45 to cancel image shake in the vertical and horizontal directions "x" and "y", respectively, of the frame 17. Thereafter the CPU 40 outputs a drive signal (pulse-modulated signal) which corresponds to the amount of driving of the first movable mirror 51 to the first stepper motor 55 via the motor driver 57 and at the same time the CPU 40 outputs a drive signal (pulse-modulated signal) which corresponds to the amount of driving of the second movable mirror 52 to the second stepper motor 56 via the motor driver 57. Upon receiving the drive signal from the motor driver 57, each of the first and second stepper motors 55 and 56 drives the corresponding movable mirror 51 or 52 to linearly move the same to stabilize an image formed on the frame 17.

Figure 12:
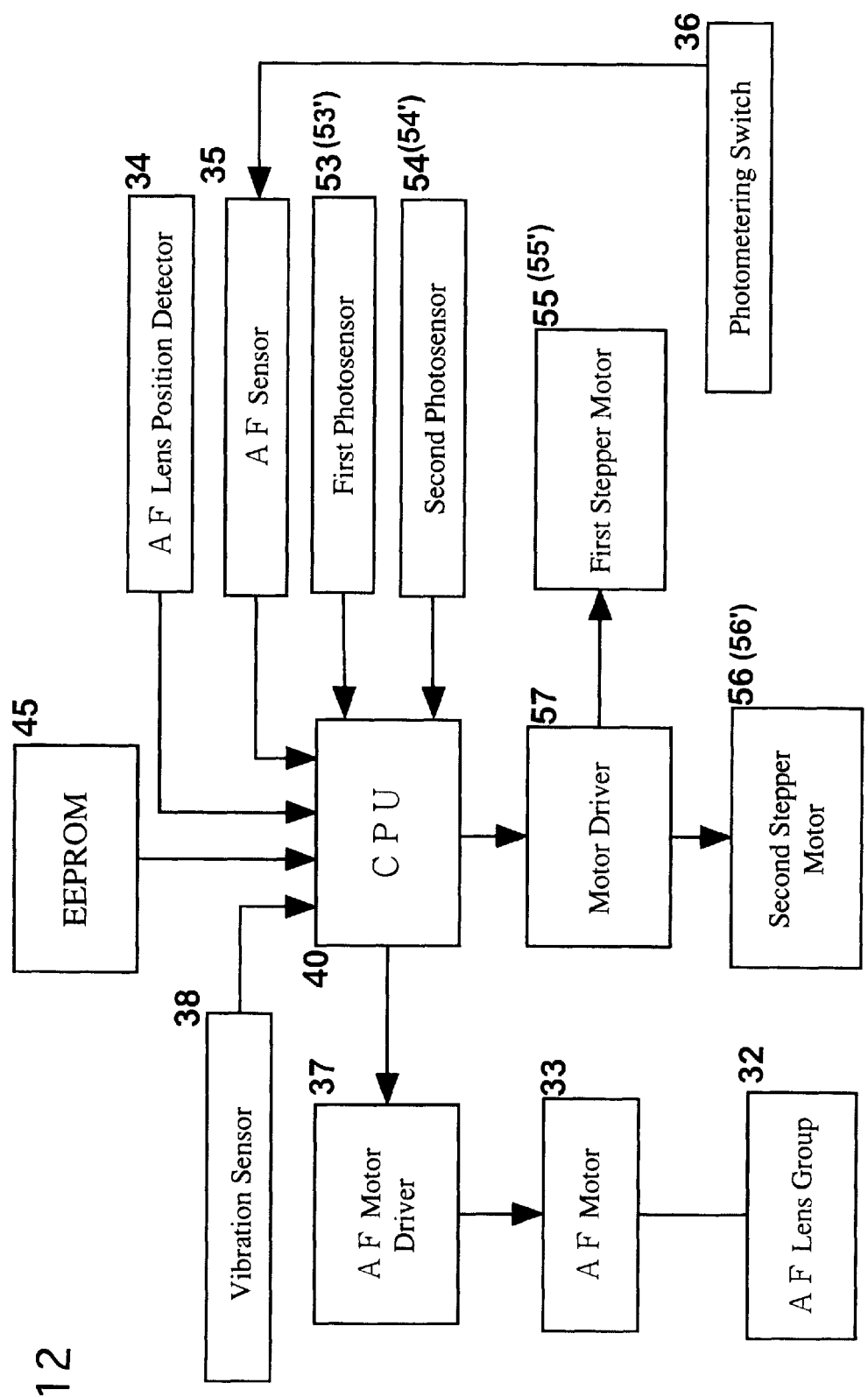
FIG. 12 is a block diagram showing an embodiment of a control system of the second embodiment of the camera.

In the case of the second drive mechanism, which is composed of the first and second movable mirror 51' and 52' (namely, in the case of driving each of the first and second movable mirrors to rotate), in the control system shown in FIG. 12 the CPU 40 outputs a drive signal (pulse-modulated signal) which corresponds to the amount of driving of the first movable mirror 51' to the first stepper motor 55' via the motor driver 57 and at the same time the CPU 40 outputs a drive signal (pulse-modulated signal) which corresponds to the amount of driving of the second movable mirror 52' to the second stepper motor 56' via the motor driver 57. Whether or not the first and second movable mirrors 51' and 52' are positioned at the initial positions thereof is detected by the first and second photosensors 53' and 54', respectively. The rotational position of the first and second movable mirrors 51' and 52' with respect to the initial rotational position thereof (i.e., the amount of driving of each movable mirror 51' and 52' from the initial rotational position thereof and the rotating direction of each movable mirror 51' and 52') can be detected by referring to the number of pulses contained in the drive signal input to each of the first and second stepper motors 55' and 56', so that the first and second movable mirrors 51' and 52 are driven to respective positions thereof to offset the shaking of an image formed on the frame 17 in accordance with the magnitude and direction of vibration of the camera 50.

In the camera 50 shown in FIG. 7, since the optical path length of the photographic optical system varies due not only to the movement of the first movable mirror 51 (51') but also to the movement of the second movable mirror 52 (52'), it is preferable that the AF operation be carried out with consideration of the variation of the optical path length caused by the movement of the first and second movable mirrors 51 (51') and 52 (52'). For example, in the case (first case) where the first movable mirror 51 is driven to move rearward along the first optical axis OT from the initial position thereof to compensate image shake in the vertical direction "x", e.g., from the initial position shown by a solid line to the position shown by a two-dot chain line in FIG. 8 by an amount of driving (first driving amount) $\alpha_3$; and at the same time, the second movable mirror 52 is driven to move upwards along the second optical axis $OM_1$ from the initial position thereof to compensate image shake in the horizontal direction "y", e.g., from the initial position shown by a solid line to the position shown by a two-dot chain line in FIG. 9 by an amount of driving (second driving amount) $\beta_1$, the optical path length from the rear end of the photographic lens group 12 to the film 16 increases by the sum of the first and second driving amount ($\alpha_3+\beta_1$), which makes an image formed on the frame 17 out-of-focus. The degree of this focus deviation is larger than that of the case shown in FIG. 1 where only one movable mirror is driven. Conversely, in the case (second case) where the first movable mirror 51 is driven to move forwards along the first optical axis OT from the initial position thereof to compensate image shake in the vertical direction "x" and at the same time the second movable mirror 52 is driven to move upwards along the second optical axis $OM_1$ from the initial position thereof to compensate image shake in the horizontal direction "y", the optical path length from the rear end of the photographic lens group 12 to the film 16 decreases by the sum of the first and second driving amount, which also makes an image formed on the frame 17 an out-of-focus. The degree of this focus deviation is also larger than that of the case shown in FIG. 1 where only one movable mirror is driven. Furthermore, in the case (third case) where the first movable mirror 51 is driven to move forwards and rearward along the first optical axis OT while the second movable mirror 52 is driven to move downwards and upwards along the second optical axis $OM_1$, respectively, the optical path length from the rear end of the photographic lens group 12 to the film 16 varies (either increases or decreases) by the difference between the driving amounts of movement of the first and second movable mirrors 51 and 52. In any one of the aforementioned first, second and third cases, the amount of driving of each movable mirror 51 and 52 from the initial rotational position thereof and the rotating direction of each movable mirror 51 and 52 can be detected by referring to the initial position thereof, detected by the corresponding photosensor 53 or 54, and the number of pulses contained in the drive signal input to the corresponding stepper motors 55 and 56. Therefore, it is possible to carry out the AF operation wherein a focus deviation caused by the variation of the optical path length is properly compensated, in accordance with the aforementioned method. Namely, an in-focus position of the AF lens group 32 on the optical axis thereof (i.e., the first optical axis OT) is determined by utilizing the data of the detected amount of driving and the rotating direction of each movable mirror 51 and 52 and at the same time the drive signal which is output from the AF motor driver 37 to be input to the AF motor 33 to move the AF lens group 32 to the in-focus position thereof is generated with consideration of the AF compensation value, which corresponds to the variation of the optical path length caused by the movement of each of the first and second movable mirrors 51 and 52 in the AF operation.

The optical path length from the rear end of the photographic lens group 12 to the film 16 varies also in the case of rotating the first and second movable mirrors 51' and 52' to compensate the vertical and horizontal directions "x" and "y", respectively. The optical path length from the rear end of the photographic lens group 12 to the film 16 is shortest when each movable mirror 51' and 52' is in the initial rotational position thereof. The ratio of the variation in the optical path length to the amount of rotation of the first movable mirror 51' from the initial rotational position thereof and also the ratio of the variation in the optical path length to the amount of rotation of the second movable mirror 52' from the initial rotational position thereof can be calculated from the performance and relative positions of optical elements in the photographic optical system. Therefore, similar to the case using the linearly-movable first and second movable mirrors 51 and 51, it is possible to carry out the AF operation wherein a focus deviation caused by the variation of the optical path length is properly compensated, in accordance with the aforementioned method. Namely, an in-focus position of the AF lens group 32 on the optical axis thereof is determined by utilizing the data of the detected amount of rotation from the initial position thereof and the rotating direction of each movable mirror 51' and 52'; and the drive signal which is output from the AF motor driver 37 to be input to the AF motor 33 to move the AF lens group 32 to an in-focus position thereof is generated with consideration of the AF compensation value, which corresponds to the variation of the optical path length caused by the movement of each of the first and second movable mirrors 51' and 52' in the AF operation.

In either the aforementioned third or fourth case, it is possible to detect the degree of a focus deviation caused by the variation of the optical path length by referring to the result of detection of each AF lens position detector 53 (or 53') and 54 (or 54') and the number of pulses contained in the drive signal input to each stepper motor 55 (or 55') and 56 (or 56'). Therefore, it is possible to carry out the AF operation wherein a focus deviation caused by the variation of the optical path length is properly compensated if an in-focus position of the AF lens group 32 on the optical axis thereof is determined by referring to the data of the detected amount of driving and the driving direction of each movable mirror 51 (or 51') and 52 (or 52'). At the same time, the drive signal which is output from the AF motor driver 37 to be input to the AF motor 33 to move the AF lens group 32 to the in-focus position thereof is generated with reference to the AF compensation value which corresponds to the variation of the optical path length.

In either photographic optical system shown in FIGS. 1 or 7, although an image shake in the vertical direction "x" of the frame 17 is prevented from occurring by driving a movable mirror (the movable motor 14, 51 or 51') positioned behind the photographic lens group 12, an image shake in the horizontal direction "y" of the frame 17 can also be prevented from occurring by driving a movable mirror positioned behind the photographic lens group 12.

Figure 13:
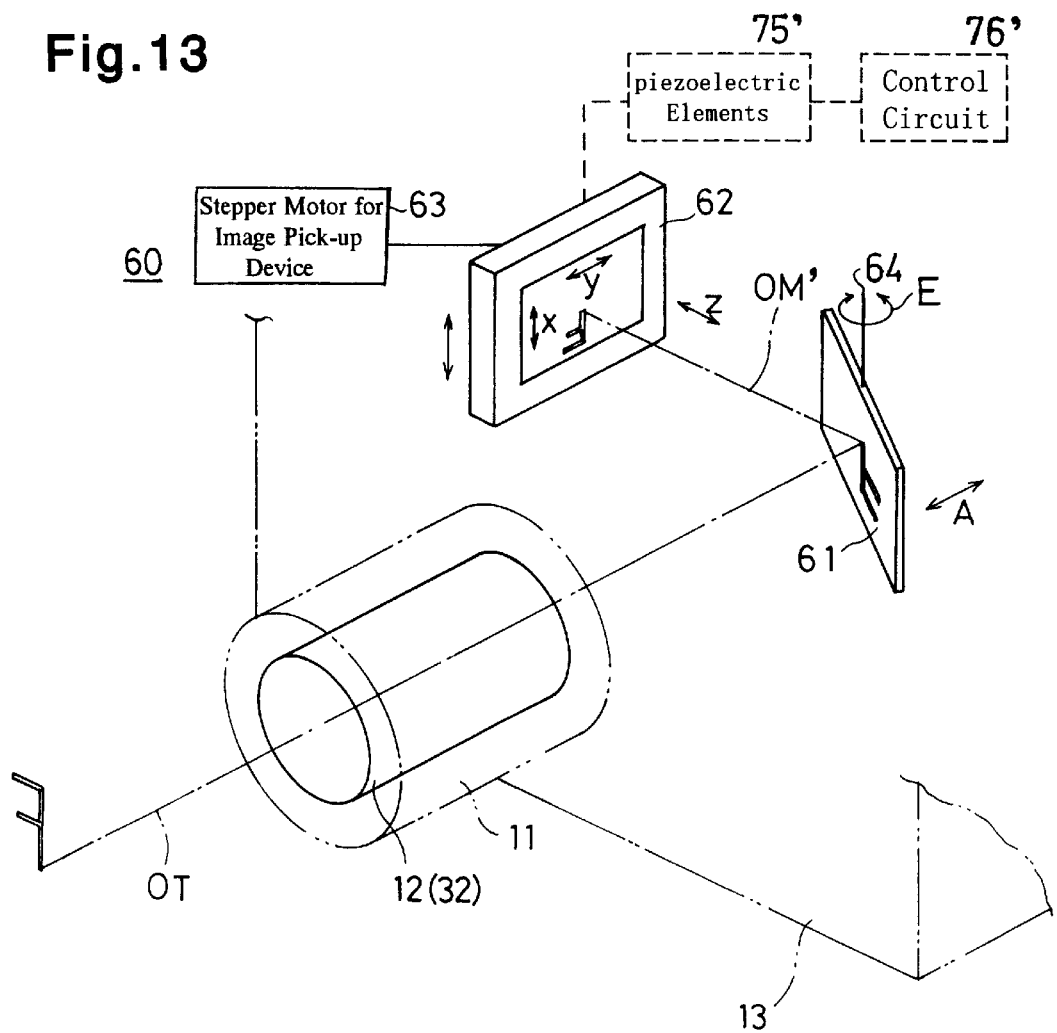
FIG. 13 is a perspective view of the third embodiment of a photographic optical system of a camera having an image stabilizer to which the present invention is applied.

FIG. 13 shows the third embodiment of photographic optical system of a camera 60 having an image stabilizer to which the present invention is applied. In this embodiment, image shake in the horizontal direction "y" can be prevented from occurring by driving a movable mirror 61 which is positioned behind the photographic lens group 12 of a camera 60. The movable mirror 61 is positioned in the camera body 13 of the camera 60 so as to reflect the incident light by an approximate right angle towards a CCD 62 (image pick-up device) which is positioned on the left side of the movable mirror 61 as viewed from the front of the camera 60. Accordingly, the photographic optical system shown in FIG. 13 has a first optical axis OT which extends from the photographic lens group 12 to the movable mirror 61 and a second optical axis OM' which extends from the movable mirror 61 to the light receiving surface of the CCD 62 (image plane). The first and second optical axes OT and OM' extend perpendicular to each other. In FIG. 13, an arrow "x" represents the vertical direction (up-down direction) of an image captured through the CCD 62, while an arrow "y" represents the horizontal direction (right-left direction) of the same captured through the CCD 62. The image captured through the CCD 62 is stored in a predetermined memory (not shown).

The movable mirror 61 can be supported via a similar arrangement to that of the movable mirror 14 or the first movable mirror 51. Namely, the movable mirror 61 can be supported to be linearly movable along the first optical axis OT (in the direction shown by an arrow "A" in FIG. 13) without varying the angle of reflection. Moving the movable mirror 61 along the first optical axis OT causes the second optical axis OM' to move in the first optical axis OT, so that the image on the CCD 62 moves in the same direction, i.e., in the horizontal direction "y".

The CCD 62 is supported so as to be linearly movable along the vertical direction "x" (i.e., the vertical direction of the camera body 13). A stepper motor 63 is positioned adjacent to the CCD 62 to drive the same in the vertical direction "x". Moving the CCD 62 in the vertical direction "x" causes the image formed on the light receiving surface of the CCD 62 to move thereon in the same direction. The CCD 62 is guided in the vertical direction "x" by any conventional guiding mechanism. For instance, such a conventional guiding mechanism can be composed of a couple of opposing guide rails or grooves formed in the camera body 13 to extend in the vertical direction "x" and a corresponding couple of guide projections which respectively project from the right and left sides of the CCD 62 to be fitted in the couple of opposing guide rails or grooves. With this guiding mechanism, the couple of guide projections are respectively guided in vertical direction "x" by the couple of guide rails or grooves, so that the CCD 62 can move in the vertical direction "x".

Therefore, the shaking of an image formed on the CCD 62 in the vertical and horizontal directions can be respectively compensated to stabilize the image by relatively moving the image on the light receiving surface of the CCD 62 by means of driving the CCD 62 and the movable mirror 61 by an appropriate amount of movement in an appropriate direction. The control system shown in FIG. 4 can be used for the embodiment shown in FIG. 13 if the first stepper motor 21 and the first photosensor 23 are replaced by the stepper motor 63 and a detector (not shown) for detecting the position of the CCD 62 in the vertical direction "x", respectively.

In the photographic optical system shown in FIG. 13, the movable mirror 61 can be of a type which is rotatable about a rotational axis 64 in a direction shown by an arrow "E" in FIG. 13. The rotational axis 64 extends in a direction perpendicular to a plane including the first and second optical axes OT and OM'. The drive mechanism shown in FIG. 5 can be adopted for such a rotatable mirror.

The optical path length from the rear end of the photographic lens group 12 to the CCD 62 varies in either case of linearly moving or rotating the movable mirror 61 to compensate the horizontal direction "y". Therefore, it is preferable to carry out the AF operation wherein a focus deviation caused by moving of the movable mirror 61 is properly compensated, wherein an in-focus position of the AF lens group 32 on the optical axis thereof is determined by referring to the data of the detected amount of rotation from the initial position thereof and the rotating direction of the movable mirror 61. This method is similar to the aforementioned method.

As mentioned before, the present invention can be applied to not only a camera using a light sensitive film but also a digital still camera using an image pick-up device. For instance, in the embodiments of photographic optical systems shown in FIGS. 1 and 7, the film 16 can be replaced by an image pick-up device such as a CCD. Likewise, in the photographic optical system of the camera 60 shown in FIG. 13, the CCD 62 can be replaced by a light sensitive film (e.g., 35 mm film). In the case where the CCD 62 is replaced by a light sensitive film, the film needs to be moved in the vertical direction "x" (i.e., the vertical direction of the camera body 13) to compensate image shake in the same direction, which makes the drive mechanism for moving the film complicated. Hence, the optical configuration shown in FIG. 13 is preferably used with an image pick-up device, not with a light sensitive film.

Figure 14:
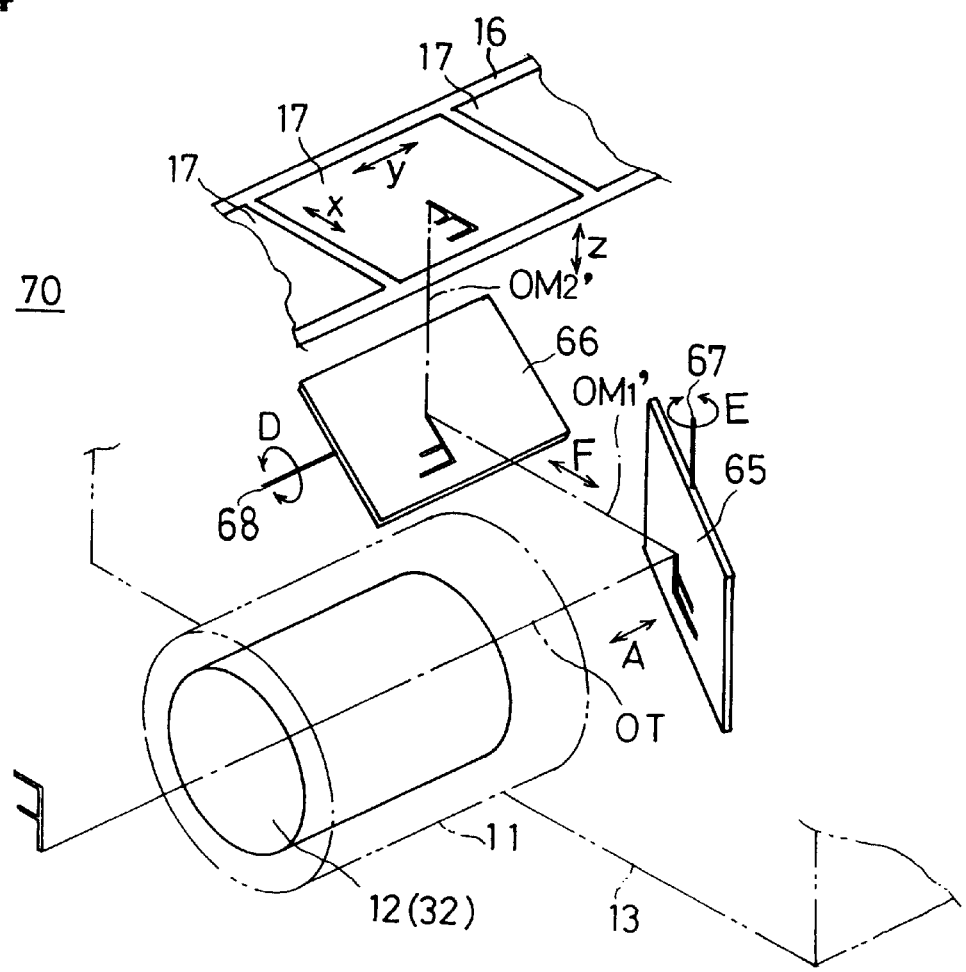
FIG. 14 is a perspective view of the fourth embodiment of a photographic optical system of a camera having an image stabilizer to which the present invention is applied.

According to the image stabilizer of the camera 50 shown in FIG. 7, image shake in the vertical direction "x" is compensated by moving the first movable mirror 51 (or 51') while image shake in the horizontal direction "y" is compensated by moving the second movable mirror 52 (or 52'). FIG. 14 shows the fourth embodiment of a photographic optical system of a camera 70 having an image stabilizer to which the present invention is applied. This embodiment has a converse arrangement of the movable mirrors as compared with the embodiment shown in FIG. 7 (camera 50). Namely, in the fourth embodiment, an image shake in the horizontal direction "y" is compensated by moving the first movable mirror 65 while an image shake in the vertical direction "x" is compensated by moving the second movable mirror 66.

The first movable mirror 65 is arranged and driven in the same manner as the first movable mirror 61 shown in FIG. 13. The first movable mirror 65 is positioned in the camera body 13 of the camera 70 so as to reflect the incident light by an approximate right angle towards the second movable mirror 66, which is positioned on the left side of the first movable mirror 65 as viewed from the front of the camera 70. The second movable mirror 66 reflects the incident light upwards by an approximate right angle to focus an image on the film 16. As can be seen in FIG. 14, in the camera 70 (the fourth embodiment), the image plane on which an image is focused is positioned above the second movable mirror 66 so that the second movable mirror 66 reflects the incident light to the frame 17 which lies on the image plane. The first movable mirror 65 is supported in the camera body 13 so as to be either linearly movable along the first optical axis OT (in a direction shown by an arrow "A" in FIG. 14) without varying the angle of reflection, or to be rotatable about a first rotational shaft 67 in a rotational direction shown by an arrow "E" in FIG. 14. The first rotational shaft 67 extends perpendicular to a plane which includes the first optical axis OT and a second optical axis $OM_1'$. The photographic optical system of the camera 70 includes the first optical axis OT which extends from the photographic lens group 12 to the first movable mirror 65, the second optical axis $OM_1'$ which extends from the first movable mirror 65 to the second movable mirror 66, and a third optical axis $OM_2'$ which extends from the second movable mirror 66 to the frame 17 (image plane). The first, second and third optical axes OT, $OM_1'$ and $OM_2'$ extend in different directions perpendicular to one another. An image formed on the frame 17 moves in the horizontal direction "y" thereof by either linearly moving or rotating the first movable mirror 65.

Similarly, the second movable mirror 66 is supported in the camera body 13 so as to be either linearly movable along the second optical axis $OM_1'$ (in a direction shown by an arrow "F" in FIG. 14) without varying the angle of reflection, or to be rotatable about a second rotational shaft 68 in a rotational direction shown by an arrow "D" in FIG. 14. The second rotational shaft 68 extends perpendicular to a plane which includes the second optical axis $OM_1'$ and the third optical axis $OM_2'$. An image formed on the frame 17 moves in the vertical direction "x" thereof by either linearly moving or rotating the second movable mirror 66. Therefore, the shaking of an image formed on the frame 17 in the vertical and horizontal directions can be compensated to stabilize the image by relatively moving the image on the frame 17 by driving each of the first and second movable mirrors 65 and 66 by an appropriate amount of movement in an appropriate direction. Similar to the third embodiment of the camera 50, it is preferable that the first drive mechanism for driving the first movable mirror 65 be composed of components similar to those of the second drive mechanism for driving the second movable mirror 66 to reduce the cost of production. However, the first drive mechanism can be composed of different components from those of the second drive mechanism.

In the camera 70 shown in FIG. 14, since the optical path length of the photographic optical system varies due not only to the movement of the first movable mirror 65 but also to the movement of the second movable mirror 66, it is preferable that the AF operation be carried out with consideration of the variation of the optical path length caused by the movement of the first and second movable mirrors 65 and 66. Therefore, it is preferable to carry out the AF operation wherein a focus deviation caused by moving of the movable mirrors 65 and 66 is properly compensated, wherein in accordance with the aforementioned method an in-focus position of the AF lens group 32 on the optical axis thereof is determined by referring to the data of the detected amount of driving from the initial position thereof and the driving direction of each of the first and second movable mirrors 65 and 66. This makes it possible to prevent focus deviation and image shake from occurring at the same time.

In each embodiment (cameras 10, 50, 60 and 70), a focus deviation caused by the movement of the movable mirror(s) is compensated via the moving of the AF lens group 32. However, the focus deviation can be prevented by an alternative method wherein an image-recording medium (a film frame or an image pick-up device) on which an image is formed through the photographic lens group is driven to move in a direction perpendicular to the image plane (in a direction shown by an arrow z in FIGS. 1, 7, 13 and 14).

Figure 15:
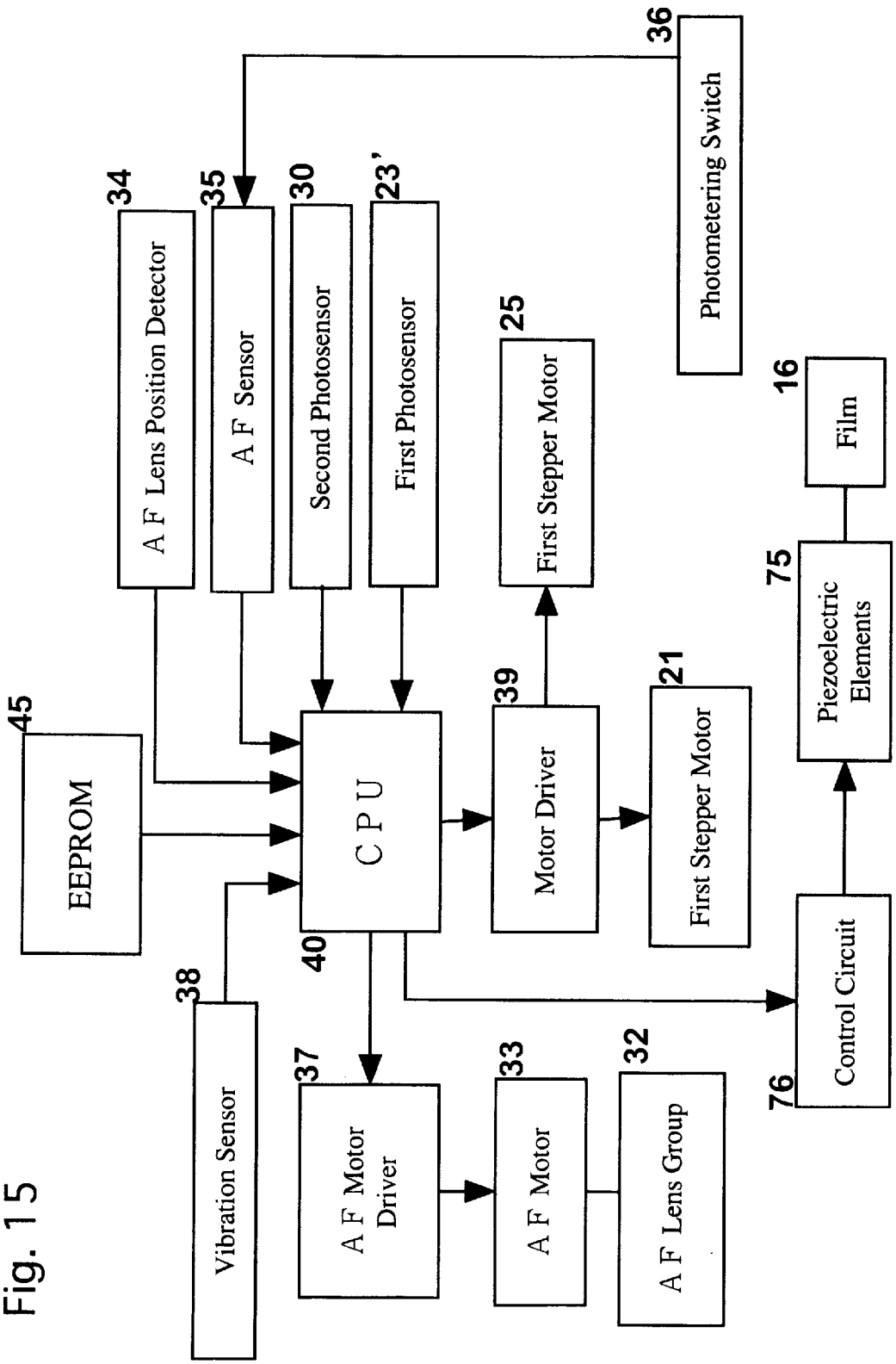
FIG. 15 is a block diagram showing an embodiment of a control system of the camera shown in FIG. 1 in the case where a focus deviation caused by the movement of the movable mirror is compensated via the moving of an image-recording medium (film)
Figure 16:
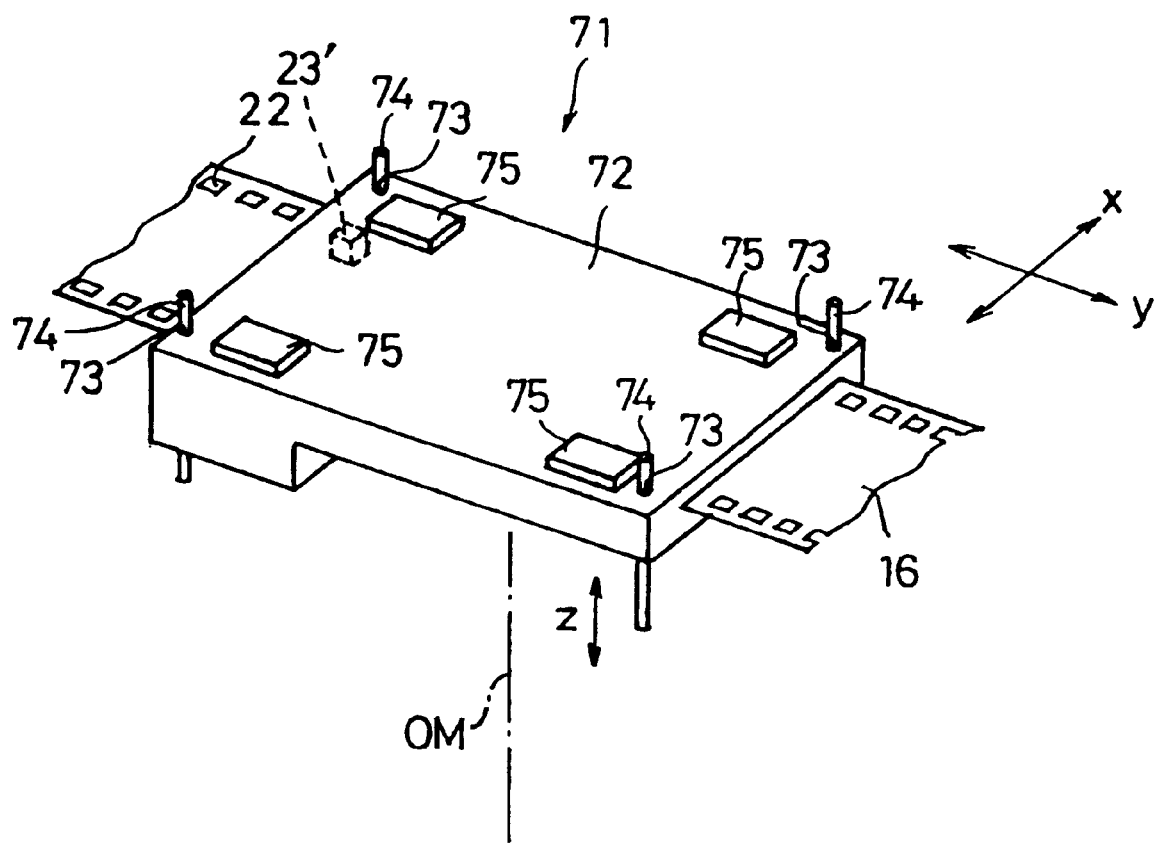
FIG. 16 is a perspective view of a driving mechanism for driving a film in a direction perpendicular to an image plane, which is provided the camera shown in FIG. 1.

FIG. 15 shows an embodiment of another control system of the camera 10 shown in FIG. 1, in the case where the film 16 (image-recording medium) is driven to move in a direction perpendicular to the image plane (i.e., in the direction shown by the arrow "z" in FIG. 1). FIG. 16 shows an embodiment of a drive mechanism 71 for driving the film 16 in the "z" direction, which is provided in the camera 10. The film 16 is guided to be moved (fed) in the direction shown by the arrow "by" by a film support housing 72. The sprocket 20 and the first stepper motor 21, though not shown in FIG. 16, are arranged within the film support housing 72. In other words, the film feeding mechanism is in the housing 72. The film support housing 72 is provided with four guide holes 73 which extend in a direction parallel to the second optical axis OM. Four guide shafts 74 which extend in a direction parallel to the second optical axis OM (i.e., parallel to the guide holes 73) and whose respective ends are secured to an inner part or parts (not shown) of the camera body 13, are inserted into the guide holes 73, so that the film support housing 72 is slidable along the guide shafts 74.

Four piezoelectric elements 75 are provided between the film support housing 72 and an internal portion or portions (not shown) of the camera body 13. Piezoelectric elements, which are well known in the art, change the amount of expansion thereof according to a given voltage. The amount of expansion of each piezoelectric element 75 is controlled by the CPU 40 via a control circuit 76 (FIG. 15) which supplies voltage to each piezoelectric element 75. Although not shown in FIG. 16, the four control circuits 76 corresponding to the four piezoelectric elements 75 are arranged within the housing 72.

With this structure, the film 16 can be driven in the two different directions, i.e., in the feeding direction thereof (i.e., in the horizontal direction "y") via the sprocket 20 and the first stepper motor 21, and the direction shown by the arrow "z" via the piezoelectric elements 75. The direction shown by the arrow "z" extends perpendicular to a plane which includes the vertical and horizontal axes "x" and "y". The position of the film 16 along the feeding direction thereof is detected by a first photosensor 23' (similar to the first photosensor 23 shown in FIG. 1) provided in the film support housing 72, while the position of the film 16 along the direction shown by the arrow "z" is detected by referring to the voltage supplied to the piezoelectric elements 75, and utilizing the same.

In addition to the aforementioned data table (first data table) for compensating image shake, another data table (second data table) containing different AF compensation values for compensating the variation of the optical path length caused by the movement of the movable mirror 14 in the AF operation is pre-stored in the EEPROM 45 as a control (voltage) value of the control circuits 76 which corresponds to the expansion value of the piezoelectric elements 75. When the movable mirror 14 is driven for compensating image shake, the CPU 40 determines an in-focus position of the film 16 in the direction shown by the arrow "z", using the appropriate AF compensation value obtained by referring to the amount of driving of the movable mirror 14 and the driving direction thereof, and utilizing the same. Then the CPU 40 controls the amount of expansion of the piezoelectric elements 75 to move the film 16 to the determined in-focus position via the control circuits 76. This makes it possible to prevent a focus deviation which occurs at the time of driving the image stabilizer from occurring. Note that in this embodiment, AF operations (i.e., focusing operation in accordance with object distance information) are primarily carried out by moving the AF lens group 32.

Similarly, the cameras 50 and 70 shown in FIGS. 7 and 14 can be modified so that the film 16 is driven in the direction shown by the arrow "z" by a film driving mechanism similar to the drive mechanism 71 shown in FIG. 16.

Further, in the camera 60 shown in FIG. 13 having the CCD 62 (image pick-up device) in place of the film, the CCD 62 can be driven in the direction shown by the arrow "z" For example, the CCD 62 is slidably guided to move in the "z" direction by a guide mechanism (not shown) similar to the aforementioned film guide mechanism of FIG. 16 containing the guide holes 73 and guide shafts 74. As shown by phantom lines in FIG. 13, piezoelectric elements 75' and control circuits 76' are provided to move the CCD 62 in the "z" direction. When the optical path length is varied in the camera 60 by moving the movable mirror 61, the CCD 62 is moved in the "z" direction via the piezoelectric elements 75' and control circuits 76' in accordance with the amount of movement of the movable mirror 61 and the direction thereof. Accordingly, the occurrence of a focus deviation caused by the variation of the optical path length can be prevented.

Figure 17:
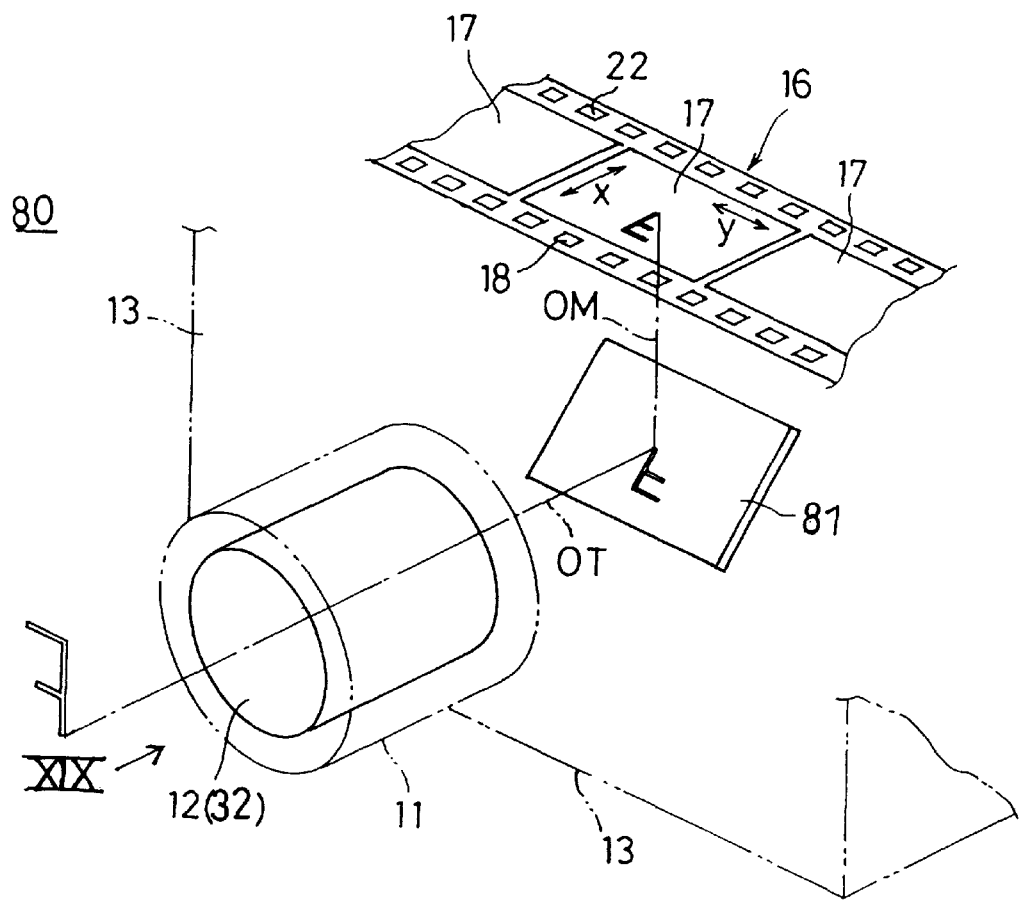
FIG. 17 is a perspective view of the fifth embodiment of a photographic optical system of a camera having an image stabilizer to which the present invention is applied.

FIG. 17 shows the fifth embodiment of the photographic optical system of a camera 80 having an image stabilizer to which the present invention is applied. The structure of the camera 80 is identical to that of the first embodiment of the camera 10 except for the difference in the drive mechanism for driving the movable mirror. Although the camera 80 uses a light sensitive film 16, the film 16 can be replaced by an image pick-up device such as a CCD. Namely, the camera 80 can be constructed as a digital still camera or digital imaging camera.

Figure 18:
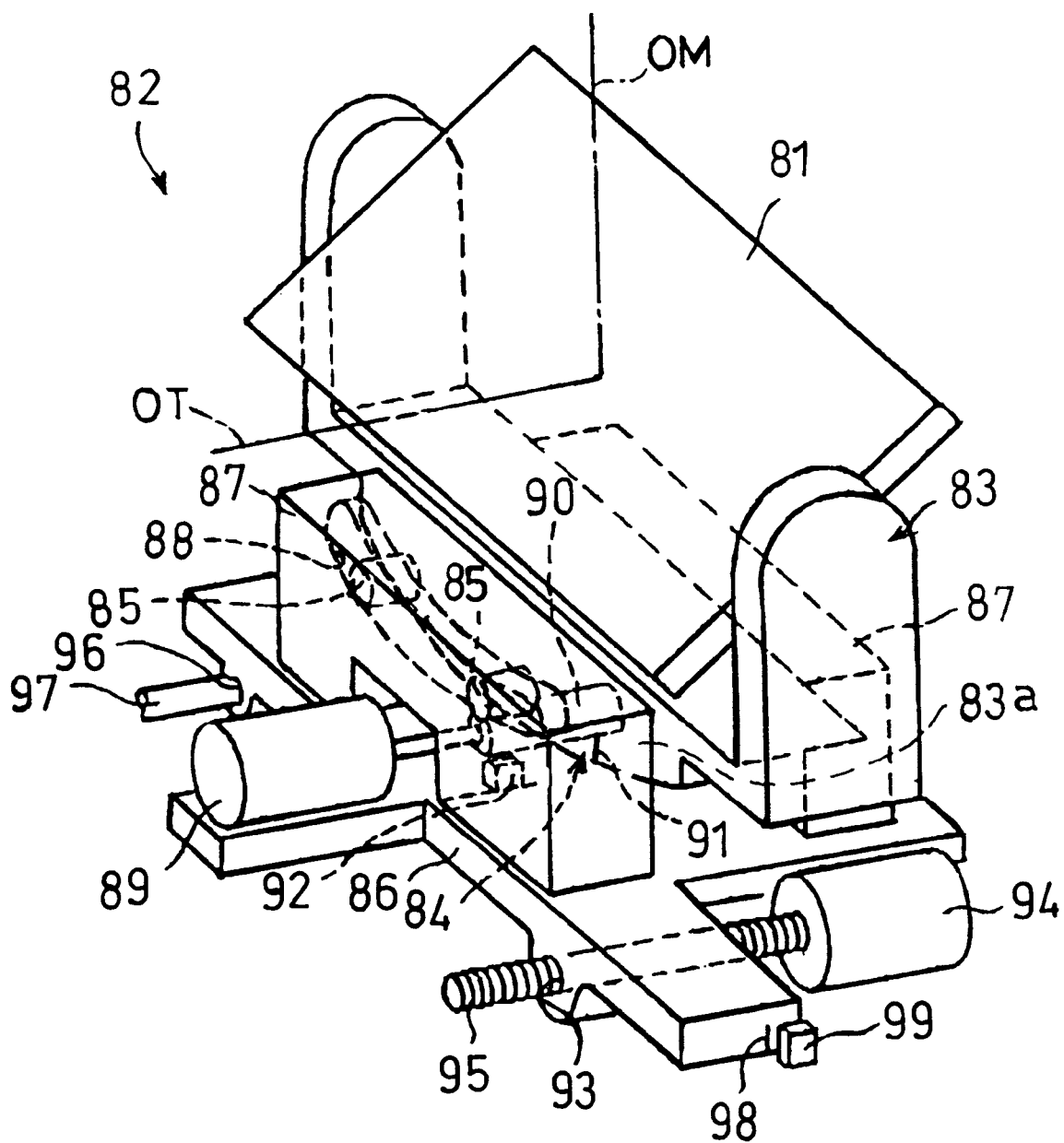
FIG. 18 is a perspective view of a drive mechanism for rotating and linearly moving a movable mirror positioned in the camera body of the fifth embodiment of the camera.

The camera 80 is provided with a drive mechanism 82 (see FIG. 18) for driving a movable mirror 81 in two different directions. The drive mechanism 82 is provided with a supporting frame 83 which supports the movable mirror 81. The movable mirror 81 is secured to the supporting frame 83 to reflect the incident light, which passes through the photographic lens group 12 to be incident on the movable mirror 81 along the first optical axis OT, and reflecting off thereby towards the frame 17 by 90 degrees. Namely, the movable mirror 81 is secured to the supporting frame 83 so that the reflection surface of the movable mirror 81 is angled by 45 degrees with respect to the first optical axis OT. The supporting frame 83 is provided at the bottom thereof with a sector gear portion 84. More specifically, the supporting frame 83 is provided at the bottom thereof with a base portion 83a having a convex cylindrical surface at the bottom thereof, and a plurality of teeth are formed on the convex cylindrical surface of the base portion 83a to form the sector gear portion 84. The supporting frame 83 is provided on each of the front and rear surfaces of the base portion 83a with a couple of follower pins 85 which extend parallel to each other in the direction of the first optical axis OT. In FIG. 18 only the two follower pins 85 formed on the front surface of the base portion 83a are shown by dotted lines. The four follower pins 85 are arranged so that the axes thereof lie in a common cylindrical surface about the first optical axis OT.

The drive mechanism 82 is provided under the supporting frame 83 with a movable plate 86. The movable plate 86 is provided integral thereon with front and rear supporting protrusions 87 between which the sector gear portion 84 is positioned. The front and rear supporting protrusions 87 are provided with each of the opposing surfaces thereof with a curved guide groove 88 which extend along a circle about the first optical axis OT. The two of the front follower pins 85 are fitted in the front guide groove 88, while the two of the rear follower pins 85 are fitted in the rear guide groove 88. In FIG. 18 only the front guide groove 88 is shown by dotted lines. With the structure of the front and rear follower pins 85 being respectively fitted in the front and rear guide grooves 88, the supporting frame 83 is rotatable about the first optical axis OT with respect to the movable plate 86.

The drive mechanism 82 is provided with a first stepper motor 89 for driving the supporting frame 83. The first stepper motor 89 is secured to the upper face of the movable plate 86 so that the drive shaft of the first stepper motor 89 extends substantially parallel to the first optical axis OT towards a space under the sector gear portion 84. A pinion gear 90 is fixed on the tip of the drive shaft of the first stepper motor 89. The pinion 90 is in mesh with the sector gear portion 84 of the supporting frame 83. Therefore, when the first stepper motor 89 is actuated to rotate the drive shaft thereof, the supporting frame 83 together with the movable mirror 81 rotates about the first optical axis OT.

The supporting frame 83 is provided with a marking 91. A first photosensor 92 for detecting the marking 91 is fixed onto the movable plate 86 adjacent to the marking 91. Specifically, the first photosensor 92 detects whether or not the movable mirror 81 (or the supporting frame 83) is positioned at the predetermined initial rotational position thereof about the first optical axis OT by detecting the marking 31. The rotational position of the movable mirror 81 with respect to the initial rotational position thereof (i.e., the amount of driving of the movable mirror 81 from the initial rotational position thereof and the driving direction of the movable mirror 81) can be detected by referring to the number of pulses contained in the drive signal supplied from the CPU 40 to the first stepper motor 89.

The movable plate 86 is provided with a screw hole 93 which extends in the direction parallel to the first optical axis OT. The drive mechanism 82 is provided with a second stepper motor 94 for driving the movable plate 86. The second stepper motor 94 is secured to a stationary portion (not shown in FIG. 18) of the camera body 13 therein. The second stepper motor 94 is provided with a drive shaft 95 on which a male screw thread is formed. The drive shaft 95 is fitted in the screw hole 93 so that the male screw thread of the drive shaft 95 is in mesh with a female screw thread formed on the inner peripheral surface of the screw hole 93. The movable plate 86 is provided with a guide hole 96 which extends in the direction parallel to the first optical axis OT, i.e., parallel to the screw hole 93. A guide shaft 97 which extends in the direction parallel to the first optical axis O and whose respective ends are secured to an inner part or parts of the camera body 13 is fitted in the guide hole 96 so that the movable plate 86 is slidable along the guide shaft. With this structure, when the second motor 94 is actuated to rotate the drive shaft 95 thereof, the movable plate 86 moves in the direction parallel to the first optical axis OT along the guide shaft 97 through the engagement of the male screw thread on the drive shaft 95 with the female screw thread on the screw hole 93.

The movable plate 86 is provided with a marking 98. A second photosensor 99 for detecting the marking 98 is secured to a stationary portion (not shown in FIG. 18) of the camera body 13 to be positioned adjacent to the marking 98. Specifically, the second photosensor 99 detects whether or not the movable mirror 81 is positioned at the predetermined initial position thereof in the direction of the first optical axis OT by detecting the marking 31. The position of the movable mirror 81 in the direction of the first optical axis OT with respect to the initial position thereof (i.e., the amount of driving of the movable mirror 81 from the initial position thereof and the driving direction of the movable mirror 81) can be detected by referring to the number of pulses contained in the drive signal supplied from the CPU 40 to the second stepper motor 94.

Figure 19:
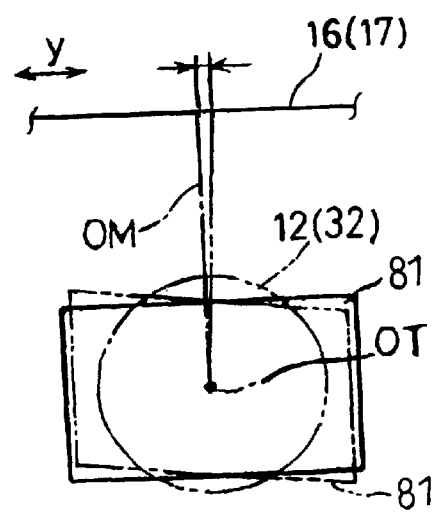
FIG. 19 is a front view of the photographic optical system shown in FIG. 17, showing a variation of an optical path when the movable mirror is rotated about a rotational axis parallel to light which is incident on the movable mirror by the drive mechanism shown in FIG. 18, viewed from a direction shown by an arrow XIX in FIG. 17.

According to the drive mechanism 82, when the movable mirror 81 is rotated about the first optical axis OT by the first stepper motor 89, the second optical axis OM is deflected as shown in FIG. 19 so that an image formed on the frame 17 (or the light receiving surface of an image pick-up device) moves in the right/left direction (the horizontal direction "y") on the frame 17. In this fifth embodiment of photographic optical system, an image formed on the frame 17 moves to the right on the frame 17 when the movable mirror 81 rotates clockwise about the first optical axis OT, while the same moves to the left on the frame 17 when the movable mirror 81 rotates counterclockwise about the first optical axis OT, as the movable mirror 81 is viewed from the front of the camera 80.

On the other hand, when the movable mirror 81 is moved in the direction of the first optical axis OT by the second stepper motor 94, the second optical axis OM moves in the same direction (the front/rear direction of the camera 80) so that an image formed on the frame 17 (or the light receiving surface of an image pick-up device) moves in the vertical direction "x" on the frame 17.

Figure 21:
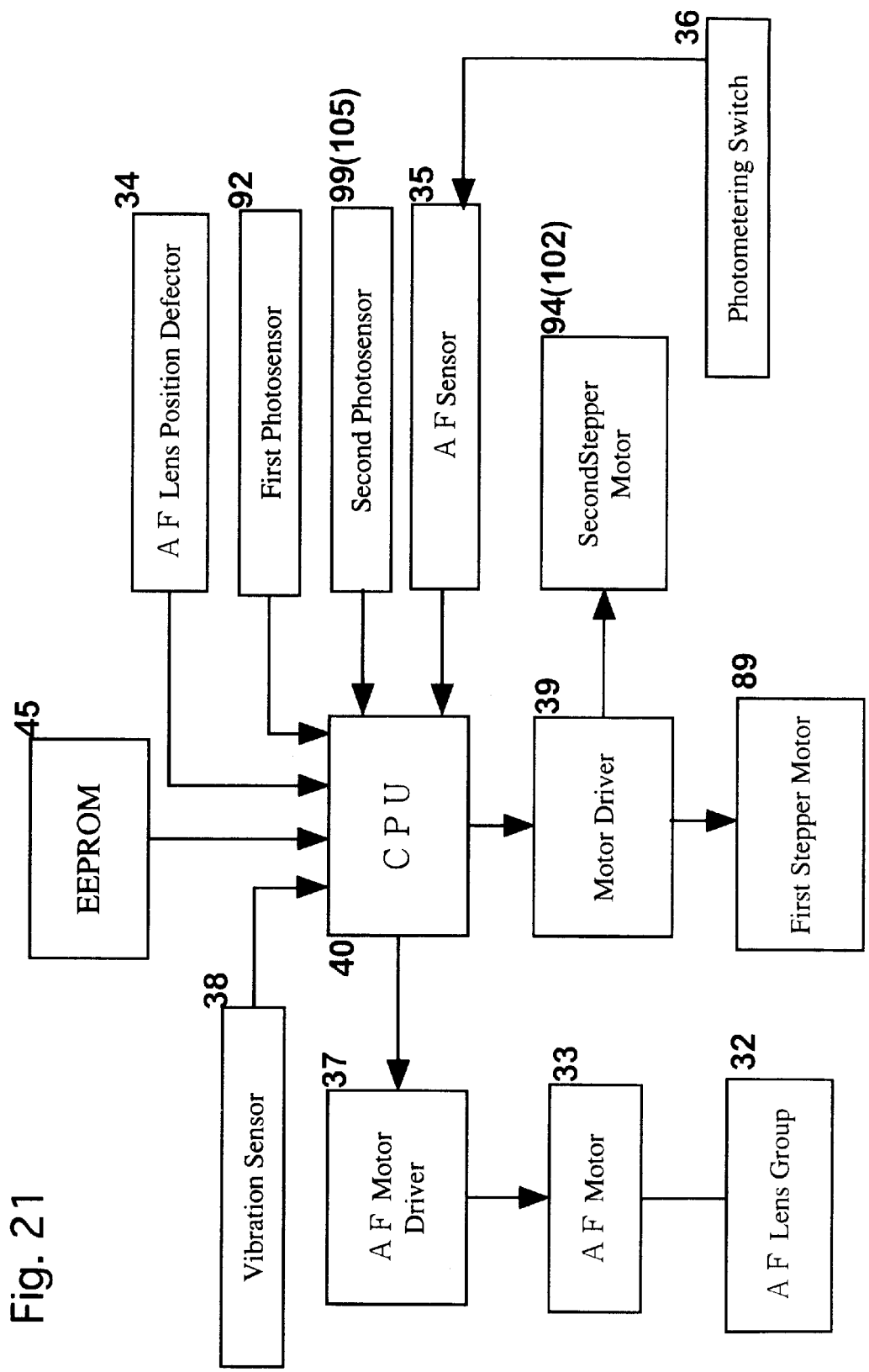
FIG. 21 is a block diagram showing an embodiment of a control system of the fifth embodiment of the camera.

Therefore, the shaking of an image formed on the image plane can be compensated in both the vertical and horizontal directions "x" and "y" by moving a single movable mirror (the movable mirror 81) by detecting the magnitude and direction of the vibration of the camera 80 with the vibration sensor 38 (see FIG. 21) and subsequently supplying the drive signal for compensating the vibration from the CPU 40 to each of the first and second stepper motors 89 and 94 to move the movable mirror 81 in the direction of the first optical axis OT while rotating the movable mirror 81 about the first optical axis OT in accordance with the supplied drive signals. Similar to the previous embodiment, information on the relationship between the angular speed of the camera body 81 and the necessary amount of rotating of the movable mirror 81 about the first optical axis OT (the number of drive pulses for the first stepper motor 89) and also information on the relationship between the angular speed of the camera body 81 and the necessary amount of moving the movable mirror 81 in the direction of the first optical axis OT (the number of drive pulses for the second stepper motor 94), for compensating the shaking of an image formed on the image plane, is pre-stored as a first data table in the EEPROM 45 (see FIG. 21) connected with the CPU 40. The CPU 40 determines the number of drive pulses for each of the first and second stepper motors 89 and 94 by referring to the first data table.

Figure 20:
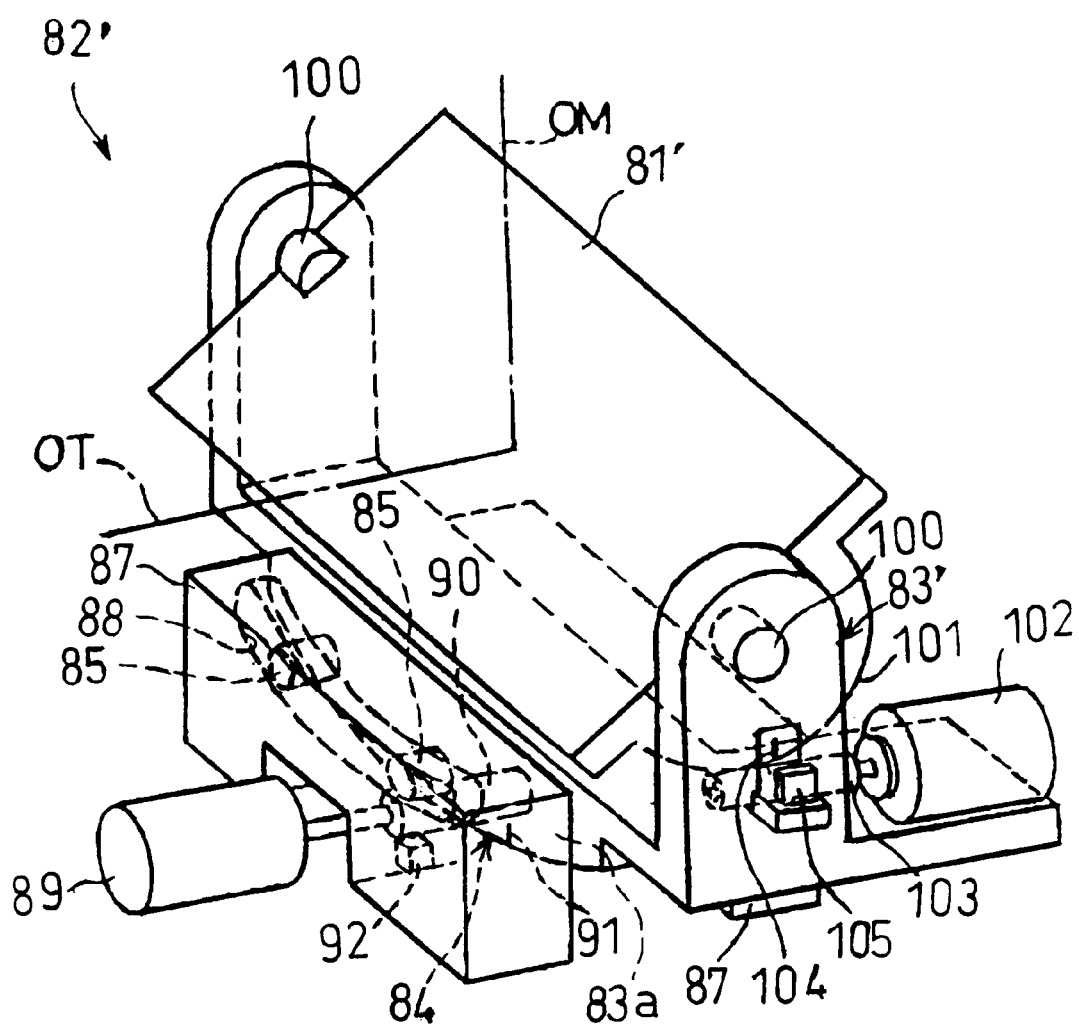
FIG. 20 is a perspective view of a drive mechanism for rotating a movable mirror positioned in the camera body of the fifth embodiment of the camera, about two rotational axes perpendicular to each other.

FIG. 20 shows another embodiment of the drive mechanism for driving the movable mirror of the camera 80 in two different directions. In this embodiment, elements or components similar to those in the embodiment shown in FIG. 18 are designated by the same reference numerals.

In this embodiment, a movable mirror 81' which corresponds to the movable mirror 81 is driven by a drive mechanism 82'. According to the drive mechanism 82', the movable mirror 81' is supported by the same mechanism as that shown in FIG. 18 which drives the movable mirror 81' to rotate about the first optical axis OT. Therefore, when the movable mirror 81' is rotated about the first optical axis OT by the first stepper motor 89, the second optical axis OM is deflected so that an image formed on the frame 17 (or the light receiving surface of an image pick-up device) moves in the right/left direction (the horizontal direction "y") on the frame 17.

The movable mirror 81' is provided on the right and left sides thereof with two coaxial shafts 100 which are rotatably supported by a supporting frame 83', so that the movable mirror 81' is rotatable about the shafts 100. The common axis of the right and left coaxial shafts 100 extends perpendicular to a plane including the first and second optical axes OT and OM and passes the point of intersection between the first and second optical axes OT and OM.

The movable mirror 81' is provided about one of the shafts 100 with a semicircular worm wheel 101. The second stepper motor 102 is secured onto the supporting frame 83' so that a worm 103 fixed on the drive shaft of the second stepper motor 102 meshes with the worm wheel 101. With this structure, rotating the worm 103 by driving the second stepper motor 102 in forward and reverse directions causes the movable mirror 81' to rotate in forward and reverse rotational directions about the shafts 100. When the movable mirror 81' is positioned at the initial position thereof, the reflecting surface of the movable mirror 81' is inclined to the first optical axis OT by an angle of 45 degrees, i.e., the angle of reflection of incident light on the movable mirror 81' is 90 degrees. The movable mirror 81' is provided on a side of the worm wheel 101 with a marking 104.

A second photosensor 105 for detecting the marking 104 is positioned adjacent to the movable mirror 81'. The second photosensor 105 detects whether or not the movable mirror 81' is positioned at the predetermined initial rotational position thereof by detecting the marking 104. The rotational position of the movable mirror 81' with respect to the initial rotational position thereof (i.e., the amount of driving of the movable mirror 81' from the initial rotational position thereof and the rotational direction of the movable mirror 81') can be detected by referring to the number of pulses contained in the drive signal input to the second stepper motor 102.

According to the drive mechanism 82', when the movable mirror 81' is rotated about the shafts 100 by the second stepper motor 102, the light reflected by the movable mirror 81' to be incident upon the frame 17 is deflected in the vertical direction "x" of the frame 17, similar to the case using the movable mirror 14' shown in FIG. 6, so that an image formed on the frame 17 (or the light receiving surface of an image pick-up device) moves in the vertical direction "x" on the frame 17. Accordingly, in order to compensate the shaking of an image formed on the frame 17 in the vertical direction "x" thereof, the drive mechanism shown in FIG. 18 for moving the movable mirror in the direction of the first optical axis OT can be replaced by the drive mechanism shown in FIG. 20 for rotating the movable mirror about the shafts 100, which extends perpendicular to a plane including the first and second optical axes OT and OM. Therefore, the shaking of an image formed on the frame 17 in the vertical and horizontal directions "x" and "y" can be compensated to stabilize the image by rotating the movable mirror 81' about each of the two rotational axes extending perpendicular to each other by an appropriate amount of movement in an appropriate direction.

In the embodiment of the camera 80, since the optical path length of the photographic optical system varies due to the movement of the movable mirror 81 or 81', it is preferable that the AF operation be carried out with consideration of the variation of the optical path length caused by the movement of the movable mirror 81 or 81'. Since the operation for preventing the optical path length from varying due to the movement of the movable mirror has been already discussed above, such an operation will be hereinafter discussed briefly.

In addition to the aforementioned first data table (data table for compensating image shake), another data table (second data table) containing different AF compensation values for compensating the variation of the optical path length caused by the movement of the movable mirror 81 or 81' in the AF operation is pre-stored in the EEPROM 45. The amount of driving of the movable mirror 81 or 81' from the initial position thereof and also the direction of driving of the movable mirror 81 or 81' can be detected by referring to the number of pulses contained in the drive signal input to the first and second stepper motors 89 and 94 (or 102), so that the CPU 40 selects an appropriate AF compensation value, which corresponds to the variation of the optical path length caused by the movement of the movable mirror 81 or 81' in the AF operation, from the second data table by referring to the first data table. Taking this selected AF compensation value into account, the CPU 40 adjusts the amount of driving of the AF lens group 32 which is determined based on the object distance information to thereby determine the drive signal for driving the AF lens group 32. The CPU 40 outputs this drive signal to the AF motor driver 37 for driving the AF motor 33. An in-focus position of the AF lens group 32 on the optical axis thereof (i.e., the first optical axis OT) is determined by utilizing the data of the current axial position of the AF lens group 32 which is detected by the AF lens position detector 34, so that the drive signal which is output from the AF motor driver 37 to be input to the AF motor 33 to move the AF lens group 32 to the in-focus position thereof corresponds to the amount of movement of the AF lens group 32 from the current axial position to the in-focus position thereof. The AF lens group 32 is driven to the in-focus position thereof, which is determined by the control, when the focusing operation is carried out.

As can be understood from the foregoing, according to the fifth embodiment of the photographic optical system of the camera 80, the shaking of an image formed on the image plane can be compensated in both the vertical and horizontal directions "x" and "y" by moving a single movable mirror, which is provided in the camera body, in two different directions, so that a small image stabilizer of the camera can be realized.

Note that in the fifth embodiment (camera 80), a focus deviation caused by the moving of the movable mirror 81 (81') can be compensated via the moving of the film 16 in a direction perpendicular to the image plane (i.e., in a direction shown by an arrow "z" in FIG. 17). Further, in the camera 80, the film 16 can be replaced by an image pick-up device.

As can be understood from the foregoing, in each embodiment, the camera is provided with at least one movable mirror in the optical path between the photographing lens and the image plane, used for stabilizing an image formed on the image plane. The movable mirror is constructed so as to compensate an image formed on the image plane when the movable mirror is driven in accordance with the magnitude of the vibration given to the camera and the direction thereof. With this structure, it is no longer necessary for the photographic lens group to be provided with an image stabilizer; and hence, facilitating miniaturization of a compact photographic lens. Furthermore, since no image stabilizer is arranged within the photographic lens, the design and arrangement of lens elements, shutter mechanisms, zooming mechanisms, and other components in the photographic lens are not restricted thereby.

Although in each embodiment the image stabilizer stabilizes an image formed on the image plane in both the vertical and horizontal directions "x" and "y", the image stabilizer can be modified to stabilize the image only in the vertical direction "x". This is because image shake occurs mainly in the vertical direction of the camera at the time the release switch of the camera is depressed. In other words, in the first embodiment of the camera 10 shown in FIG. 1, the operation of driving the film 16 for compensating an image shake in the horizontal direction "y" with the use of the first stepper motor 21 and the first photosensor 23 can be omitted. Likewise, in the camera 50 (the second embodiment) shown in FIG. 7, the operation of driving the second movable mirror 52 or 52' for compensating an image shake in the horizontal direction "y" can also be omitted. Conversely, if it is necessary to stabilize the image only in the horizontal direction "y", the operation of driving the image pick-up device (CCD) 62 or the second movable mirror 66 for compensating image shake in the vertical direction "x" can be omitted.

According to the embodiment shown in FIG. 7 or 14, the shaking of an image formed on the image plane can be compensated in both the vertical and horizontal directions "x" and "y" (i.e., in any direction parallel to the image plane) by driving each of the first and second movable mirrors in accordance with the magnitude of the vibration applied to the camera and the direction thereof. According to this construction, image shake in each of the vertical and horizontal directions "x" and "y" is compensated by a corresponding movable mirror, which is advantageous when the image shake needs to be finely and precisely compensated and/or when a quick response in movement of the image stabilizer is required. It is preferable that the first drive mechanism for driving the first movable mirror be composed of components similar to those of the second drive mechanism for driving the second movable mirror to reduce the cost of production. However, the first drive mechanism can be composed of different components from those of the second drive mechanism.

Figure 11:
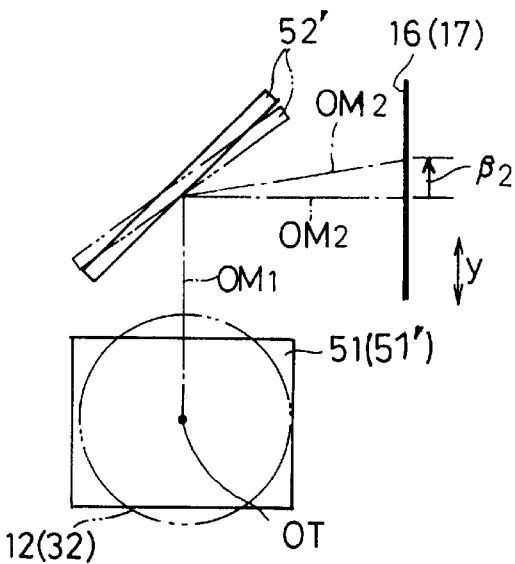
FIG. 11 is a side view of the photographic optical system shown in FIG. 7, showing a variation of the optical path when the second movable mirror shown in FIG. 7 is rotated, viewed from a direction shown by an arrow IX in FIG. 7.

In the case where the image shake needs to be compensated in two directions (the vertical and horizontal directions "x" and "y"), image shake in one direction can be compensated using a movable mirror positioned in the camera body while image shake in the other direction can be compensated by driving an image-recording medium (e.g., a film or an image pick-up device), as can be seen from FIG. 1 or 11. This construction is advantageous for achieving a compact camera because only one movable mirror needs to be provided.

Although the drive mechanism for linearly moving the movable mirror 14 shown in FIG. 2 is composed of the stepper motor 25, the drive shaft 26 having the male screw thread thereon and the screw hole 24 having a female screw thread on the inner peripheral surface thereof, any other conventional drive mechanism (e.g., a linear drive mechanism using a linear motor) can be adopted to linearly move the movable mirror 14; likewise for the drive mechanism for rotating the movable mirror 14' shown in FIG. 5, which is composed of the stepper motor 25', the worm wheel 42 and the worm 43. The movable mirror 14' can be rotated by (for example) a stepper motor whose drive shaft is directly connected to either one of the two shafts 41.

Since the AF operation is carried out with consideration of the variation of the optical path length caused by the movement of one or two movable mirrors, the occurrence of a focus deviation caused by the variation of the optical path length can be prevented. In this case, as mentioned above, such a focus deviation can be canceled by moving an AF lens group provided in the photographic lens group or by moving an image-recording medium (a film or an image pick-up device) in a direction perpendicular to the image plane.

As can be seen from the foregoing, according to the present invention, a camera having an image stabilizer for stabilizing an image formed on a film surface when the image shakes due to unstable movement of the camera has been provided, wherein design restrictions of the photographic lens of the camera is minimal. A camera wherein no focal deviation occurs due to the operation of the image stabilizer and a control method of controlling such a camera has also been provided.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera having an image stabilizer, comprising:
   a camera body;
   a photographic lens for forming an image of an object on an image plane of said camera body;
   at least one movable mirror positioned in an optical path between said photographing lens and said image plane;
   a vibration sensor for detecting the magnitude of a vibration and the direction thereof given to said camera body;
   a mirror drive mechanism for driving said movable mirror in accordance with said magnitude of said vibration and the direction thereof detected by said vibration sensor;
   a detector for detecting the amount of movement of said movable mirror from an initial position thereof, and the direction of the movement of said movable mirror;
   an AF mechanism for performing an AF operation in accordance with object distance information; and
   a controller for controlling said AF mechanism in accordance with said amount of movement of said movable mirror and the direction thereof, which are detected by said detector, so that said AF mechanism further performs said AF operation to compensate a variation of an optical path length that is caused by movement of said movable mirror.

2. The camera according to claim 1, wherein said mirror drive mechanism drives said movable mirror so that said image formed on said image plane by said photographing lens moves in a predetermined direction parallel to said image plane.

3. The camera according to claim 1, wherein said AF mechanism comprises:
   a focusing lens group which is provided as an element of said photographic lens and guided to move along an optical axis of said photographic lens;
   a distance information device for obtaining an object distance information related to an object distance of an object which is to be photographed;
   a controller for determining an in-focus position of said focusing lens group on an optical axis thereof in accordance with said object distance information and producing a drive signal corresponding to said determined in-focus position; and
   a moving device for moving said focusing lens group in accordance with said drive signal;
   wherein said controller determines said in-focus position of said focusing lens group, utilizing said object distance information with consideration of said variation of an optical path length caused by movement of said movable mirror.

4. The camera according to claim 3, further comprising memory for storing a data table which contains compensation values for compensating said variation of the optical path length,
   wherein said controller selects a compensation value, which corresponds to said variation of said optical path length, from said data table in accordance with said amount of movement of said movable mirror and the direction thereof, to determine in-focus position of said focusing lens group with consideration of said compensation value.

5. The camera according to claim 1, wherein said AF mechanism comprises:
   an image-recording medium positioned within said camera body to lie on said image plane;
   a guide mechanism for guiding said image-recording medium to move in a guide direction perpendicular to said image plane so that said image-recording medium is movable along said guide direction for focusing;
   a controller for determining an in-focus position of said image-recording medium with consideration of said variation of the optical path length being caused by movement of said movable mirror and producing a control signal corresponding to said determined in-focus position; and
   a moving device for moving said image-recording medium in accordance with said control signal.

6. The camera according to claim 5, further comprising a memory for storing a data table which contains compensation values for compensating said variation of the optical path length, wherein said controller selects a compensation value, which corresponds to said variation of said optical path length, from said data table in accordance with said amount of movement of said movable mirror and the direction thereof, to determine in-focus position of said image-recording medium with consideration of said compensation value.

7. The camera according to claim 5, wherein said image-recording medium comprises a sensitive film.

8. The camera according to claim 5, wherein said image-recording medium comprises an image pick-up device.

9. The camera according to claim 1, wherein said movable mirror comprises a pair of movable mirrors, said mirror drive mechanism comprising corresponding a pair of drive mechanisms for driving said pair of movable mirrors so that said image formed on said image plane by said photographing lens moves on said image plane in predetermined two different directions on said plane, respectively;

wherein said AF mechanism performs said AF operation to compensate a variation of an optical path length caused by a combination of movement of said pair of movable mirrors in accordance with the amount of movement of each said movable mirror and the direction thereof which are detected by said detector.

10. The camera according to claim 9, further comprising a memory for storing a data table which contains compensation values for compensating said variation of the optical path length.

11. The camera according to claim 1, wherein said mirror drive mechanism comprises at least one stepper motor for driving said at least one movable mirror, wherein said movable mirror comprises an index for indicating said initial position, and wherein said detector comprises: a sensor for sensing said index; and a device for determining said amount of movement of said movable mirror from said initial position and said direction of movement of said movable mirror in accordance with the number of pulses contained in a drive signal input to said at least one stepper motor.

12. The camera according to claim 1, wherein said mirror drive mechanism comprises:

a linear guide mechanism for guiding said movable mirror to move along an incident direction of light which is incident on said movable mirror; and a moving device for linearly moving said movable mirror in accordance with said magnitude of said vibration and the direction thereof to move light which is reflected by said movable mirror in a direction of movement of said movable mirror.

13. The camera according to claim 1, wherein said mirror drive mechanism comprises:

a supporting mechanism for supporting said movable mirror to be rotatable about a rotational axis thereof which extends perpendicular to a plane including first light which is incident on said movable mirror and second light which is reflected by said movable mirror; and a moving device for rotating said movable mirror in accordance with said magnitude of said vibration and the direction thereof to deflect light which is reflected by said movable mirror.

14. A method of controlling a camera having an image stabilizer, said camera including: a camera body; a photographic lens for forming an image of an object on an image plane of said camera body; at least one movable mirror positioned in an optical path between said photographing lens and said image plane; and an AF mechanism for performing an AF operation in accordance with object distance information, wherein said method comprises:

detecting the magnitude of a vibration and the direction thereof given to said camera body;

driving said movable mirror in accordance with said magnitude of said vibration and the direction thereof, so that said image formed on said image plane by said photographing lens moves in a predetermined direction parallel to said image plane;

detecting the amount of movement of said movable mirror from an initial position, and the direction of movement of said movable mirror; and controlling said AF mechanism to compensate a variation of an optical path length caused by movement of said movable mirror in accordance with said amount of movement of said movable mirror and the direction thereof.

15. A camera having an image stabilizer, comprising:

a camera body;

a photographic lens for forming an image of an object on an image plane of said camera body;

a pair of movable mirrors positioned in an optical path between said photographic lens and said image plane;

a vibration sensor for detecting the magnitude of a vibration and the direction thereof given to said camera body; and a pair of mirror drive mechanisms for driving said pair of movable mirrors, respectively, so that said image formed on said image plane by said photographing lens moves in two directions perpendicular to each other, and in a direction parallel to said image plane.

16. The camera according to claim 15, wherein said pair of mirror drive mechanisms are made of the same mechanical structure.

17. The camera according to claim 16, wherein each of said pair of mirror drive mechanisms comprises:

a linear guide mechanism for guiding a corresponding one of said pair of movable mirrors to move along an incident direction of light which is incident on said corresponding one of said pair of movable mirrors; and a moving device for linearly moving said corresponding one of said pair of movable mirrors in accordance with said magnitude of said vibration and the direction thereof to move light which is reflected by said corresponding one of said pair of movable mirrors in the direction of movement of said corresponding one of said pair of movable mirrors.

18. The camera according to claim 16, wherein each of said two mirror drive mechanisms comprises:

a supporting mechanism for supporting a corresponding one of said pair of movable mirrors to be rotatable about a rotational axis thereof which extends perpendicular to a plane including first light which is incident on said corresponding one of said pair of movable mirrors and second light which is reflected by said corresponding one of said air of movable mirrors; and a moving device for rotating said movable mirror in accordance with said magnitude of said vibration and the direction thereof to deflect light which is reflected by said corresponding one of said pair of movable mirrors.

19. The camera according to claim 15, wherein one of said two mirror drive mechanisms comprises:

a linear guide mechanism for guiding a corresponding one of said pair of movable mirrors to move along an incident direction of light which is incident on said corresponding one of said pair of movable mirrors; and a moving device for linearly moving said corresponding one of said pair of movable mirrors in accordance with said magnitude of said vibration and the direction thereof to move light which is reflected by said corresponding one of said pair of movable mirrors in a direction of movement of said corresponding one of said pair of movable mirrors;

wherein the other of said two mirror drive mechanisms comprises:

a supporting mechanism for supporting said the other movable mirror to be rotatable about a rotational axis thereof which extends perpendicular to a plane including first light which is incident on said the other movable mirror and second light which is reflected by said the other movable mirror; and a moving device for rotating said the other movable mirror in accordance with said magnitude of said vibration and the direction thereof to deflect light which is reflected by said the other movable mirror.

20. The camera according to claim 15, wherein said pair of movable mirrors comprises:

a first movable mirror for reflecting light which is incident thereon in a first direction perpendicular to an optical axis of said photographic lens;

a second movable mirror for reflecting light which is reflected by said first movable mirror in a second direction perpendicular to a plane including said first direction and said optical axis of said photographic lens.

21. A method of controlling a camera having an image stabilizer, said camera including: a camera body; a photographic lens for forming an image of an object on an image plane of said camera body; and first and second movable mirrors arranged at different positions in an optical path between said photographic lens and said image plane, wherein said method comprises:

moving said first movable mirror to compensate a shaking of said image in a first direction which is caused by a vibration given to said camera body; and moving said second movable mirror to compensate a shaking of said image in a second direction which is caused by a vibration given to said camera body, said second direction being perpendicular to said first direction.

22. A camera having an image stabilizer, comprising:

a camera body;

an image-recording medium positioned within said camera body;

a photographic lens for forming an image on said image-recording medium;

a movable mirror positioned in an optical path between said photographing lens and said image-recording medium;

a vibration sensor for detecting the magnitude of a vibration and the direction thereof given to said camera body;

a first drive mechanism for driving said movable mirror in accordance with said magnitude of said vibration and the direction thereof;

a second drive mechanism for driving said image-recording medium in a direction perpendicular to the direction of light which is incident on said image-recording medium.

23. The camera according to claim 22, wherein said second drive mechanism drives said image-recording medium in accordance with said magnitude of said vibration and the direction thereof, which are detected by said vibration sensor.

24. The camera according to claim 22, wherein a moving direction of said image on said image-recording medium according to the driving of said movable mirror by said first drive mechanism and a moving direction of said image on said image-recording medium according to the driving of said image-recording medium by said second drive mechanism are perpendicular to each other.

25. The camera according to claim 22, wherein said image-recording medium comprises a film, said second drive mechanism comprising a film feed mechanism for feeding said film in the longitudinal direction thereof.

26. The camera according to claim 25, wherein said film has perforations along both edges thereof, said film feed mechanism comprising:

a sprocket engaged with said perforations to move said film in a feeding direction thereof; and a device for rotating said sprocket in accordance with said magnitude of said vibration and the direction thereof, which are detected by said vibration sensor.

27. The camera according to claim 22, wherein said image-recording medium comprises an image pick-up device, said second drive mechanism comprising:

a guide mechanism for guiding said image pick-up device to move in a direction parallel to a light receiving surface of said image pick-up device; and a device for moving said image pick-up device in said direction in accordance with said magnitude of said vibration and the direction thereof, which are detected by said vibration sensor.

28. A method of controlling a camera having an image stabilizer, said camera including: a camera body; an image-recording medium positioned within said camera body; a photographic lens for forming an image of an object on said image-recording medium; and a movable mirror to reflect light which passes through said photographic lens, wherein said method comprises:

moving said movable mirror to compensate a shaking of said image in a first direction which is caused by a vibration given to said camera body; and moving said image-recording medium in a direction perpendicular to the direction of light which is incident on said image-recording medium to compensate a shaking of said image in a second direction which is caused by a vibration given to said camera body, said second direction being perpendicular to said first direction.

29. The controlling method according to claim 28, wherein said image-recording medium comprises a sensitive film.

30. The controlling method according to claim 28, wherein said image-recording medium comprises an image pick-up device.

31. The controlling method according to claim 30, wherein said image pick-up device comprises a CCD.

32. A camera having an image stabilizer, comprising:

a camera body;

a photographic lens for forming an image of an object on an image plane of said camera body;

a movable mirror positioned in an optical path between said photographing lens and said image plane;

a vibration sensor for detecting the magnitude of a vibration and the direction thereof given to said camera body;

a mirror drive mechanism for driving said movable mirror, wherein said image formed on said image plane by said photographing lens moves on said image plane in two different predetermined directions perpendicular to each other according to the movement of said movable mirror;

a detector for detecting the amount of movement of said movable mirror from an initial position thereof, and the direction of the movement of said movable mirror;

an AF mechanism for performing an AF operation in accordance with object distance information; and a controller for controlling said AF mechanism in accordance with said amount of movement of said movable mirror and the direction thereof, which are detected by said detector, so that said AF mechanism further performs said AF operation to compensate a variation of an optical path length that is caused by movement of said movable mirror.

33. The camera according to claim 32, wherein said mirror drive mechanism comprises:

a guide mechanism for linearly guiding said movable mirror to move along an incident direction of light which is incident on said movable mirror, and for supporting said movable mirror to be rotatable about a rotational axis thereof which extends parallel to light which is incident on said movable mirror;

a first moving device for rotating said movable mirror in accordance with said magnitude of said vibration and the direction thereof to deflect light which is reflected by said movable mirror; and a second moving device for linearly moving said movable mirror in accordance with said magnitude of said vibration and the direction thereof to move light which is reflected by said movable mirror in a direction of movement of said movable mirror.

34. The camera according to claim 32, wherein said mirror drive mechanism comprises:

a support mechanism for supporting said movable mirror to be rotatable about a first rotational axis thereof which extends parallel to light which is first incident on said movable mirror, and for supporting said movable mirror to be rotatable about a second rotational axis thereof which extends in a plane including said first rotational axis and second light which is reflected by said movable mirror; and a pair of moving devices for rotating said movable mirror about said pair of rotational axes, in accordance with said magnitude of said vibration and the direction thereof, to deflect light which is reflected by said movable mirror in the rotating direction of said movable mirror.

* * * * *